United States Patent
Nishikawa et al.

(10) Patent No.: US 7,328,019 B2
(45) Date of Patent: Feb. 5, 2008

(54) COMMUNICATION ENVIRONMENT MEASUREMENT METHOD FOR MOBILE STATION AND THE MOBILE STATION

(75) Inventors: Takurou Nishikawa, Kawasaki (JP); Masaaki Suzuki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 126 days.

(21) Appl. No.: 11/197,471

(22) Filed: Aug. 5, 2005

(65) Prior Publication Data
US 2006/0211391 A1    Sep. 21, 2006

(30) Foreign Application Priority Data
Mar. 17, 2005    (JP) .............................. 2005-076651

(51) Int. Cl.
*H04B 17/00*    (2006.01)
(52) U.S. Cl. ................ 455/436; 455/226.1; 455/226.3; 455/452.2; 455/453; 455/68; 455/69
(58) Field of Classification Search ................ 455/436, 455/452.2, 453, 68, 69, 226.1, 226.3
See application file for complete search history.

(56) References Cited
U.S. PATENT DOCUMENTS
4,718,081 A    1/1988    Brenig 6,262,994 B1 *    7/2001    Dirschedl et al. ........... 370/465
7,079,859 B2 *    7/2006    Nobukiyo et al. .......... 455/522
2004/0072565 A1    4/2004    Nobukiyo et al.

FOREIGN PATENT DOCUMENTS
WO    WO 93/12623    6/1993
WO    WO 02/089502    11/2002

OTHER PUBLICATIONS
3GPP TS 25.212, Jun. 2004.
3GPP TS 25.214, Jun. 2004.

\* cited by examiner

*Primary Examiner*—Joseph Feild
*Assistant Examiner*—S. Smith
(74) *Attorney, Agent, or Firm*—Bingham McCutchen LLP

(57) ABSTRACT

In a communication system for respectively transmitting pilot signals from a plurality of base stations to a mobile station via a first channel and also for transmitting data from one base station to a mobile station via a second channel, the mobile station corrects total receive power at the time of handover by subtracting power of the data signal received via the second channel from the total receive power of the signals received from a base station in communication (serving cells) via the second channel, then corrects the total noise power based on the total receive power after the correction, and measures the communication environment between the base station and the mobile station using the power of the pilot signal received from the base station in-communication and the corrected total noise power.

16 Claims, 20 Drawing Sheets

GRAPH OF RECEIVE NOISE POWER RATIO

FIG. 18 PRIOR ART
(A)
BEFORE HANDOVER
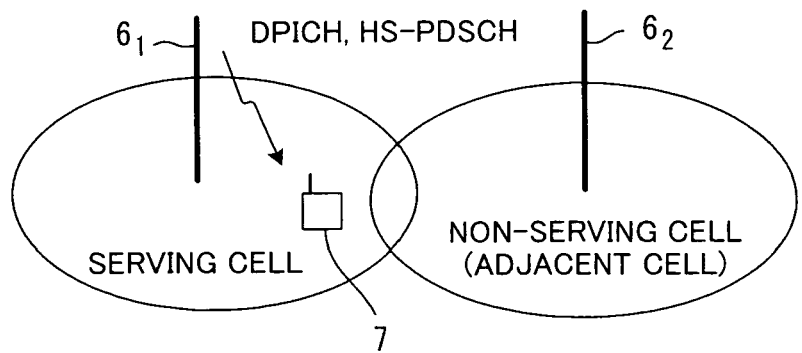
(B)
DURING HANDOVER
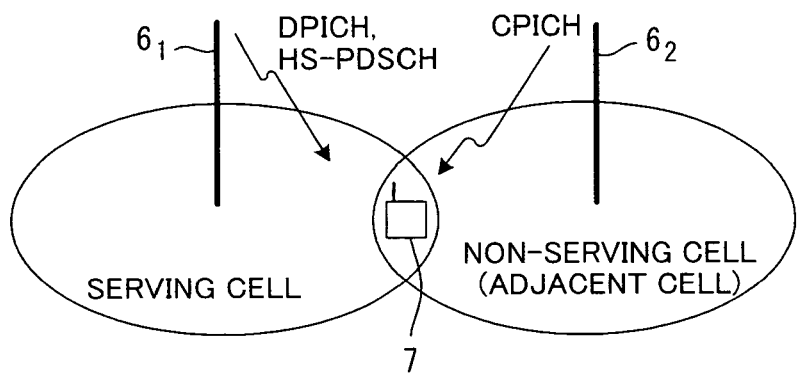
(C)
AFTER HANDOVER COMPLETION
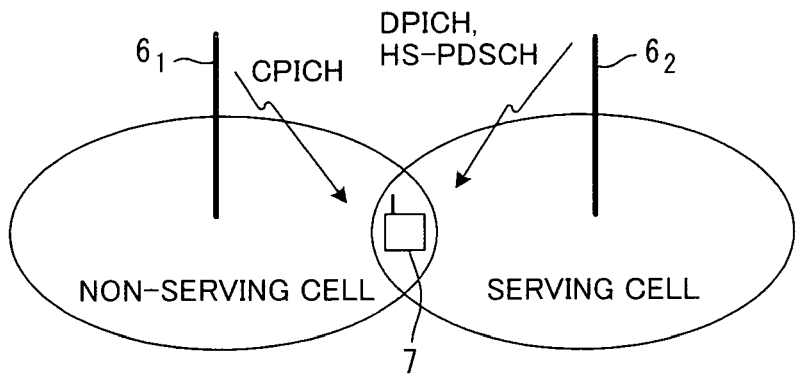

CONFIGURATION OF RECEIVE CHANNEL
AT ANTENNA TERMINAL

INTERNAL NOISE POWER OF RECEIVER

RELATIONSHIP BETWEEN SIR AND
TOTAL NOISE POWER

CONFIGURATION OF CHANNEL WHEN HS-PDSCH IS NOT USED

DECREASE OF INTERNAL NOISE POWER

INCREASE OF SIR

COMMUNICATION ENVIRONMENT MEASUREMENT METHOD FOR MOBILE STATION AND THE MOBILE STATION

BACKGROUND OF THE INVENTION

The present invention relates to a communication environment measurement method for a mobile station and a mobile station, and more particularly to a communication environment measurement method for a mobile station in a communication system where data is transmitted from one base station to the mobile station, and the mobile station.

A W-CDMA (UMTS) mobile communication system is a radio communication system where a line is shared by a plurality of users, and comprises a core network 1, radio base station controllers (RNC: Radio Network Controller) 2 and 3, multiplexers/demultiplexers 4 and 5, radio base stations (Node B) $6_1$-$6_5$ and mobile station (UE: User Equipment) 7, as FIG. 15 shows.

The core network 1 is a network for routing in the mobile communication system, and the core network can be constructed by an ATM switching network, a packet switching network or a router network, for example. The core network 1 is also connected with a public network (PSTN), so that the mobile station 7 can communication with fixed telephones.

The radio base station controllers (RNC) 2 and 3 are positioned as the host of the radio base stations $6_1$-$6_5$, and have a function to control these radio base stations $6_1$-$6_5$ (e.g. management of radio resources to be used). The radio base station controllers 2 and 3 also have a handover control function, which is a function for receiving signals sent by one mobile station 7 from a plurality of radio base stations at hand over, selecting data signal having the best quality, and sending it to the core network 1 side.

The multiplexers/demultiplexers 4 and 5 are installed between the RNC and a radio base station, and perform control to demultiplex the signals addressed to each radio base station received from the RNCs 2 and 3, and outputs them to each radio station as well as to multiplex signals from each radio station, and transfers them to each RNC.

The radio resources of the radio base stations $6_1$-$6_3$ are managed by the RNC 2, and the radio resources of the radio base stations $6_4$ and $6_5$ are managed by the RNC 3, to perform radio communication with the mobile station 7. The mobile station 7, which exists in one of the radio areas of the radio base stations $6_1$-$6_5$, establishes the radio line with one of the radio base stations $6_1$-$6_5$, and communicates with another communication device via the core network 1.

The interface between the core network 1 and the RNCs 2 and 3 is called the Iu interface, the interface between the RNCs 2 and 3 is called the Iur interface, and the interface between the RNCs 2 and 3 and each radio base station $6_1$-$6_5$ is called the Iub interface, the interface between the radio base stations $6_1$-$6_5$ and the mobile station 7 is called the Uu interface, and the network composed of devices 2-6 in particular is called a radio access network (RAN). The lines between the core network 1 and the RNCs 2 and 3 are shared by Iu and Iur interfaces, and the lines between the RNCs 2 and 3 and the multiplexers/demultiplexers 4 and 5 are shared by Iub interfaces for a plurality of radio base stations.

The above is a description on a general mobile communication system, but now a technology to allow high-speed downstream data transmission, such as HSDPA (High-Speed Downlink Packet Access), is becoming incorporated into mobile communication systems (see 3G TS 25.212 (3rd Generation Partnership Project: Technical Specification Group Radio Access Network; Multiplexing and Channel Coding (FDD)); and 3G TS 25.214 (3rd Generation Partnership Project: Technical Specification Group Radio Access Network; Physical Layer Procedure (FDD)).

HSDPA

HSDPA is a method for switching the transmission rate according to the radio environment between a radio base station and a mobile station, and switches the data size per one transport block depending on the radio environment, or adaptively switches the encoding modulation method. In the case of adaptive modulation and coding (AMC), the QPSK modulation scheme and the 16QAM scheme are adaptively switched, for example.

The HSDPA uses H-ARQ (Hybrid Automatic Repeat reQuest). In H-ARQ, if the mobile station detects an error in the receive data from the radio base station, a retransmission request (NACK signal) is sent to the radio base station. The radio base station that received this retransmission request retransmits the data, so the mobile station performs the error correction decoding using the already received data and the retransmitted receive data. In this way, in the case of H-ARQ, the already received data is effectively used even if an error occurs, so the gain of the error correction decoding increases and as a result the retransmission count can be suppressed to be low. If an ACK signal is received from a mobile station, data transmission is a success and retransmission is unnecessary, so the next data is transmitted.

The main radio channels to be used for HSDPA are, as FIG. 16 shows, (1) HS-SCCH (High Speed-Shared Control Channel), (2) HS-PDSCH (High Speed-Physical Downlink Shared Channel), and (3) HS-DPCCH (High Speed-Dedicated Physical Control Channel).

Both HS-SCCH and HS-PDSCH are shared channels in the downstream direction (downlink from the radio base station to a mobile station), and HS-SCCH is a control channel for transmitting various parameters on the data to be transmitted via HS-PDSCH. In other words, this is a channel for notifying that the data is transmitted via HS-PDSCH. The various parameters include, for example, the destination information of the mobile station to which the data is transmitted, the transmission bit rate information, the modulation scheme information on the modulation scheme with which data is transmitted via the HS-PDSCH, the number of allocated spreading codes (code count), and the pattern of the rate matching to be performed on the transmission data.

The HS-DPCCH, on the other hand, is a dedicated control channel in the upstream direction (uplink from a mobile station to a radio base station), and is used to transmit the respective receive result (ACK signal, NACK signal), depending on the presence of an error in the data received via the HS-PDSCH, to the radio base station. In other words, this is a channel to be used to transmit the receive result of the data received via the HS-PDSCH. If the mobile station fails in received data (e.g. receive data has a CRC error), the NACK signal is transmitted from the mobile station, so the radio base station executes retransmission control.

The HS-DPCCH is also used when the mobile station, which measures the receive quality such as SIR of the signal received from the radio base station, transmits this receive quality to the radio base station as CQI (Channel Quality Indicator). In other words, CQI is the information for the mobile station to report the receive environment to the base station and, for example, CQI value is 1-30, where CQI value is determined so that the block error rate BLER, does not exceed 0.1 and reported to the base station.

For example, the mobile station holds a CQI table, and determines a CQI value corresponding to the receive quality (SIR) from this CQI table, and transmits this value to the radio base station via the HS-DPCCH.

The radio base station judges whether the radio environment in the downstream direction is good or not by the received CQI, and if good, the radio base station switches the modulation scheme to one that can transmit data faster, and if not good, it switches the modulation scheme to one that transmits data slower (that is performs adaptive modulation). Actually the base station has a CQI table which defines formats with different transmission speeds according to CQI=1-30, and determines the parameters (e.g. transmission speed, modulation method, multiplexed code count) according to the CQI value obtained from this CQI table, and notifies these parameters to the mobile station by HS-SCCH, and also transmits the data to the mobile station by HS-PDSCH based on these parameters.

Channel Structure

FIG. 17 is a diagram depicting the timing of the channels in the HSDPA system. In W-CDMA, which uses code division multiple access, the codes separate each channel. The CPICH (Common Pilot Channel) and the SCH (Synchronization Channel) are shared channels in the downstream direction. The CPICH is a channel used at a mobile station for channel estimation and cell search, and is a channel for transmitting the so called pilot signals. SCH is further divided into P-SCH (Primary SCH) and S-SCH (Secondary SCH), and is a channel which is transmitted in bursts by the first 256 chips of each slot. This SCH is received by a mobile station which performs three-level cell search, and is used for establishing slot synchronization and frame synchronization and for identifying the base station code (scramble code). SCH is 1/10 the length of one slot, but is shown to be a little wider than this in FIG. 17. The remaining 9/10 is P-CCPCH (Primary-Common Control Physical Channel).

Now the timing relationship of the channel will be described. In each channel, 15 slots constitute one frame (10 ms), and one frame has a length equivalent to 2560 chip lengths. As described above, CPICH is used as a reference for other channels, so the beginning of the frame of the SCH and HS-SCCH match the beginning of the frame of CPICH. The beginning of the frame of the HS-PDSCH is two slots delayed from the HS-SCCH, but this is because the mobile station receives the modulation scheme information via HS-SCCH, and then enables the demodulation of HS-PDSCH by a demodulation scheme according to this modulation scheme. In HS-SCCH and HS-PDSCH, three slots constitute one sub-frame.

The HS-DPCCH is a channel in an upstream direction, and the first slot thereof is used to transmit an ACK/NACK signal to show the receive result of HS-PDSCH from the mobile station to the radio base station when about 7.5 slots elapse after the receipt of HS-PDSCH. The second and third slots are used to feedback and regularly transmit the CQI information for adaptive modulation control to the base station. The CQI information to be transmitted is calculated based on the receive environment (SIR measurement result of CPICH) measured during the period of four slots before to one slot before in the CQI transmission.

Handover

The mobile station 7 is communicating data via the HS-PDSCH with the base station 61 of the serving cell (see (A) of FIG. 18). At this time, handover status occurs if the mobile station 7 approaches an adjacent cell (non-serving cell) by moving (see (B) of FIG. 18). And when the quality of signals received from the base station $6_2$ of the non-serving cell, such as SIR (Signal to Interference Ratio), becomes better than the SIR of the signals received from the base station $6_1$ of the serving cell, the RNC switches the communication base station from the base station $6_1$ to the base station $6_2$ (see (C) of FIG. 18), and transmits data from the base station $6_2$ to the mobile station 7 via HS-PDSCH.

The downstream signal from each cell has a different scrambling code, so each signal is demultiplexed by de-spreading using the respective scrambling code at a mobile station. The receive signal includes a common pilot signal CPICH, so the mobile station de-spreads the receive signal by the scrambling code and demultiplexies CPICH signal base station by base station. Thereafter the CPICH signal is multiplied by the channelization code for de-spreading, and by this the average power of CPICH signal and the variance value thereof are derived, and SIR is determined for each cell using the power of CPICH signal. And the SIR of each cell is compared one another, and the cell having the highest SIR is notified to the base station as a candidate of handover destination.

FIG. 19 shows the sequence of handover, and in HSDPA, handover is performed as a hard handover.

When the mobile station 7 is communicating with the base station $6_1$ in the serving cell (step S1), and when SIR, which is the receive quality from the base station $6_2$ of the non-serving cell, becomes good, the mobile station 7 notifies the SIR of the signal received from each base station $6_1$ and $6_2$ to the RNC 2 via the higher logical channel DCCH (step S2). When the SIR report which is channel switching request is received, the RNC 2 instructs the base station $6_2$ to start up the communication channel (HS-PDSCH) allocated to the communication between the mobile station 7 and the base station $6_2$ Of the non-serving cell (handover request, step S3). When the instruction to start up the communication channel is received, the base station $6_2$ responds with a confirmation (step S4).

Then the RNC 2 notifies the communication channel (HS-PDSCH) of the handover destination to the mobile station 7 via the base station $6_1$ during communication (step S5). When the information on the communication channel of the handover destination is received, the mobile station 7 immediately switches the channel according to the communication channel, and enables communication with the base station $6_2$, and hereafter transmits/receives synchronization burst signals and communication burst signals to establish frame synchronization and to adjust time alignment with the destination base station $6_2$. And when normal communication becomes possible, the base station $6_2$ of the serving cell reports the channel start-up completion to the RNC 2 (handover: step S6). When the channel start-up completion signal is received, the RNC 2 sends an instruction to release the channel to the base station $6_1$, and ends handover (step S7). Hereafter the mobile station 7 communicates data with the base station $6_2$ via HS-PDSCH. At this time, HS-SCCH is also switched and a reception of data via HS-PDSCH is attempted when data which is transmitted from the base station $6_2$ via HS-SCCH is received.

Problems of Conventional Handover

To perform handover control, a mobile station measures the SIR quality of the receive signals from the serving cell, which is currently transmitting the HS-PDSCH signals, and the SIR quality of the receive signals from other non-serving cells. To measure these SIRs, power of CPICH signal, which is transmitted from each cell, is used. The ratio of the CPICH power to the total receive power from the serving cell, where HS-PDSCH signals are transmitted to the mobile station, is smaller than the ratio to the total receive power from the non-serving cells where HS-PDSCH signals are not transmitted to the mobile station.

The mobile station, in which an analog circuit is used for the receiver, generates fixed noise components by NF (Noise Figure) of the receiver, waveform distortion due to a filter and local phase noise. The CPICH signal of each cell is influenced by internal noise in the receive step, and in the signals from the base station transmitting data via HS-PDSCH, the SN ratio is small since the ratio of CPICH power to the total receive power is small, and as a result SIR is small.

As described above, SIR of the serving cells may decrease during handover by the amount of the influence of the HS-PDSCH signal. On the other hand, when another cell is not transmitting data via HS-PDSCH or when the power thereof is small, the deterioration of SIR could be small since the interference of HS-PDSCH is minimal. As a result, handover to the other cell which is an non-serving cell, is likely to occur easily. And if handover occurs here, the transmission of the signals of HS-PDSCH shifts to the other cell as a new serving cell. As a result, the data is transmitted from the new serving cell to the mobile station via HS-PDSCH instead, and interference increases and the SIR value of the new serving cell tends to drop. In the old serving cell, on the other hand, the data is not transmitted to the mobile station via HS-PDSCH after handover has completed, therefore interference decreases, SIR increases and SIR of the old serving cell may be higher than SIR of the new serving cell. HS-PDSCH is a hard handover, so every time a handover occurs the communication is interrupted and the throughput drops.

The reason why the SIR of signals from the base station, which transmits data through HS-PDSCH, decreases will be described. The power of the signals received by the antenna is composed of CPICH power, HS-PDSCH power, other channel power and external noise power, as shown in FIG. 20. The total receive power is the total of these powers, and as FIG. 21 shows, internal noise according to the value of this total receive power is generated. The total receive power is given by the following expression.

$$\text{Total receive power [dBm]} = \qquad (1)$$
$$10\log_{10}\{CPICH \text{ power [mW]} + HS\text{-}PDSCH \text{ power [mW]} +$$
$$\text{other channel power [mW]} + \text{external noise power [mW]}\}$$

The internal noise power is a value corresponding to the total receive power, and is given by the following expression, Internal noise power [mW]=total receive power [mW]/η, and this is converted to the following expression using by logarithm, Internal noise power [dBm]=total receive power [dBm]−internal noise power ratio [dB] (2)

In addition, the total noise power can be given by

Total noise power [dBm]=10 log$_{10}${external noise power[mW]+internal noise power [mW]} (3)

and SIR, which is calculated from CPICH, is in proportion to the ratio of the CPICH power and the total noise power, as shown in FIG. 22, so SIR can be calculated by the following formula.

SIR [dB]=CPICH power [dBm]−total noise power [dBm]+CPICH spreading gain [dB] (4)

Here it is assumed that the signals of HS-PDSCH have stopped, as shown in FIG. 23. When HS-PDSCH power stops, the total receive power decreases, as shown in FIG. 24, and according to this, the internal noise power and the total noise power decrease. Since the CPICH power does not change depending on whether HS-PDSCH power stops or not, as a result SIR increases, as shown in FIG. 25.

As described above, SIR is measured to be low when data is being received via HS-PDSCH, and SIR is measured to be high when data is not being received via HS-PDSCH. In other words, the SIR of the signal from a base station which is transmitting data via HS-PDSCH decreases, and the SIR of the signal from a base station which is not transmitting data via HS-PDSCH increases.

In this way, if a mobile station moves and a handover occurs during HS service (during status of waiting for receipt of data via HS-PDSCH), SIR tends to drop in a new serving cell and SIR tends to increase in a old serving cell, and this influence is particularly strong when high-speed transmission is performed at high power.

Because of this, the SIR measurement conditions differ between the serving cell and non-serving cell, and handover tends to occur sooner rather than at the correct timing.

In the case of HS-PDSCH, which uses a hard handover, the power of the HS-PDSCH shifts to the next base station after handover completes, so the SIR of the next base station is measured low while the SIR of the previous base station is measured high, which causes handover again.

SUMMARY OF THE INVENTION

With the foregoing in view, it is an object of the present invention to control handover by measuring the communication environment between each cell (serving cell and non-serving cell) and a mobile station, such as the SIR of receive signals, under conditions that are nearly identical.

It is another object of the present invention to prevent a drop in communication throughput by controlling handover such that an unnecessary handover is not generated.

It is still another object of the present invention to quickly control the transmission rate according to the communication environment by reporting a CQI value, based on the maximum SIR out of the SIRs measured for handover control, to the base station of the serving cells.

To solve the above problems, the present invention provides a communication environment measurement method in a mobile station included in a communication system which respectively transmits pilot signals from a plurality of base stations to a mobile station, and controls a hard handover by switching a channel for data transmission to the mobile station based on the communication environment between each base station and the mobile station, including step of measuring the communication environment between a source base station of the channel and the mobile station and the communication environment between another base station and the mobile station are measured for the handover control, and step of compensating relative deterioration of the measurement result of the communication environment on the source base station of the channel in comparison with the measurement result of the communication environment on the other base station, the relative deterioration being caused by the transmission of the channel.

In the above method, the compensating step includes correcting total receive power by subtracting power of a signal transmitted to the mobile station by way of the channel from the total receive power of signals transmitted from the source base station; calculating total noise power based on the total receive power after the correction; and measuring the communication environment between the source base station of the channel and the mobile station using power of the pilot signal received from the source base station of the channel and the total noise power.

Alternatively in the above method, the compensating step includes estimating signal power in a case where a signal is received from the other base station via the channel, correcting total receive power by adding the estimated signal power to the total receive power of signals received from the other base station, calculating the total noise power based on the total receive power after the correction, and measuring the communication environment between the other base station and the mobile station using power of the pilot signal received from the other base station and the total noise power.

To solve the above problems, the present invention provides a mobile station included in a communication system which respectively transmits pilot signals from a plurality of base stations to a mobile station and controls a hard handover by switching a channel for data transmission to the mobile station based on the communication environment between each based station and the mobile station, comprising a measuring unit for measuring the communication environment between a source base station of the channel and the mobile station and the communication environment between another base station and the mobile station for hard handover control, and a compensation unit for compensating relative deterioration of the measurement result of the communication environment on the source base station of the channel in comparison with the measurement result of the communication environment on the other base station, the relative deterioration being caused by the transmission of the channel.

In the above mobile station, the compensation unit comprises: a total receive power measurement unit for measuring total receive power of the signals received from the source base station of the channel; a signal power measurement unit for measuring power of the signal of the channel received from the source base station of the channel; a pilot signal power measurement unit for measuring signal power of the pilot signals received from the source base station of the channel; and a communication environment measurement unit for correcting the total receive power by subtracting the power of the signal received via the channel from the total receive power, calculating total noise power based on the total receive power after the correction, and measuring the communication environment between the source base station of the channel and the mobile station using the pilot signal power and the total noise power.

Alternatively the compensation unit further includes: a total receive power measurement unit for measuring total receive power of the signals received from the other base station; a pilot signal power measurement unit for measuring signal power of the pilot signal received from the other base station; and a communication environment measurement unit for estimating signal power in a case where a signal is received from the other base station via the channel, correcting the total receive power by adding the estimated signal power to the total receive power of the signals received from the other base station, calculating total noise power based on the total receive power after the correction, and measuring the communication environment between the other station and the mobile station using the signal power of the pilot signal received from the other base station and the total noise power.

Further alternatively the compensation unit comprises: a judgment unit for judging the timing when data is communicated via the channel referring to the control channel to be transmitted from the source base station of the channel; a communication environment measurement unit for measuring the communication environment between the source base station of the channel and the mobile station based on the pilot signal received from the source base station of the channel at the timing; and a communication environment measurement unit for measuring the communication environment between the other base station and the mobile station based on the pilot signal received from the other base station which is not in-communication.

The mobile station further comprises means for determining maximum SIR, which is a ratio of the pilot signal power and the noise signal power, out of the SIRs of a plurality of base stations measured when the communication environment between the base station and the mobile station was measured as SIR, and means for feeding back the communication environment instruction value corresponding to the maximum SIR to the source base station.

According to the present invention, the communication environment, such as SIR, between the serving cells/non-serving cells and a mobile station, can be measured under the same conditions, so the quality of the communication environment can be accurately judged and handover can be controlled based on this judgment, therefore handover can be executed at a correct timing.

Also according to the present invention, the communication environment, such as the SIR of receive signals, between the serving cells/non-serving cells and a mobile station, can be measured under the same conditions, so the quality of the communication environment can be accurately judged and handover can be controlled based on this judgment, therefore the generation of unnecessary handover can be avoided and a drop in the communication throughput can be prevented.

Also according to the present invention, a CQI value corresponding to the maximum SIR out of the SIRs measured for handover control is reported to the serving cell, so even if the serving cell is switched by handover, the transmission rate can be quickly controlled according to the communication environment of the serving cell.

Other features and advantages of the present invention will be apparent from the following description taken in conjunction with the accompanying drawings.

BRIEF DESCRIPTION OF THE DRAWINGS

FIG. 18 are diagrams depicting handover;

DESCRIPTION OF THE PREFERRED EMBODIMENTS

In the case of a communication system for respectively transmitting pilot signals from a plurality of base stations to a mobile station via the first channel (e.g. CPICH), and transmitting data to the mobile station from one of the base stations via the second channel (e.g. HS-PDSCH) on which hard handover is executed, a base station which communicates with a mobile station is switched based on the communication environment, such as SIR, between each base station and the mobile station, so that the mobile station is able to continue communication while moving (handover). For this, the mobile station measures the communication environment of a base station which is in-communication via the second channel and that of the adjacent base station which is not in-communication under the same conditions, and notifies the result to the network side.

When the communication environment between the mobile station and the base station in-communication is measured, the mobile station corrects the total receive power by subtracting the receive power of the signal received via the second channel from the total receive power of the signals received from the base station in-communication, and corrects the total noise power based on this total receive power after the correction, and measures the communication environment between the base station in-communication and the mobile station using the signal power of the pilot signals received from the base station in-communication and the corrected total noise power. By this, on the assumption that data is not communicated via the second channel, the communication environment of the base station in-communication can be estimated. As to communication environment of a base station which is not in-communication, on the other hand, the mobile station measures the communication environment between this base station, which is not in-communication, and the mobile station using the pilot signals received from the base station which is not in-communication. By this, the communication environment at the time when each base station is not communicating data in the second channel, can be measured and notified to the network side.

(A) First Embodiment

Configuration of Mobile Station

Figure 1:
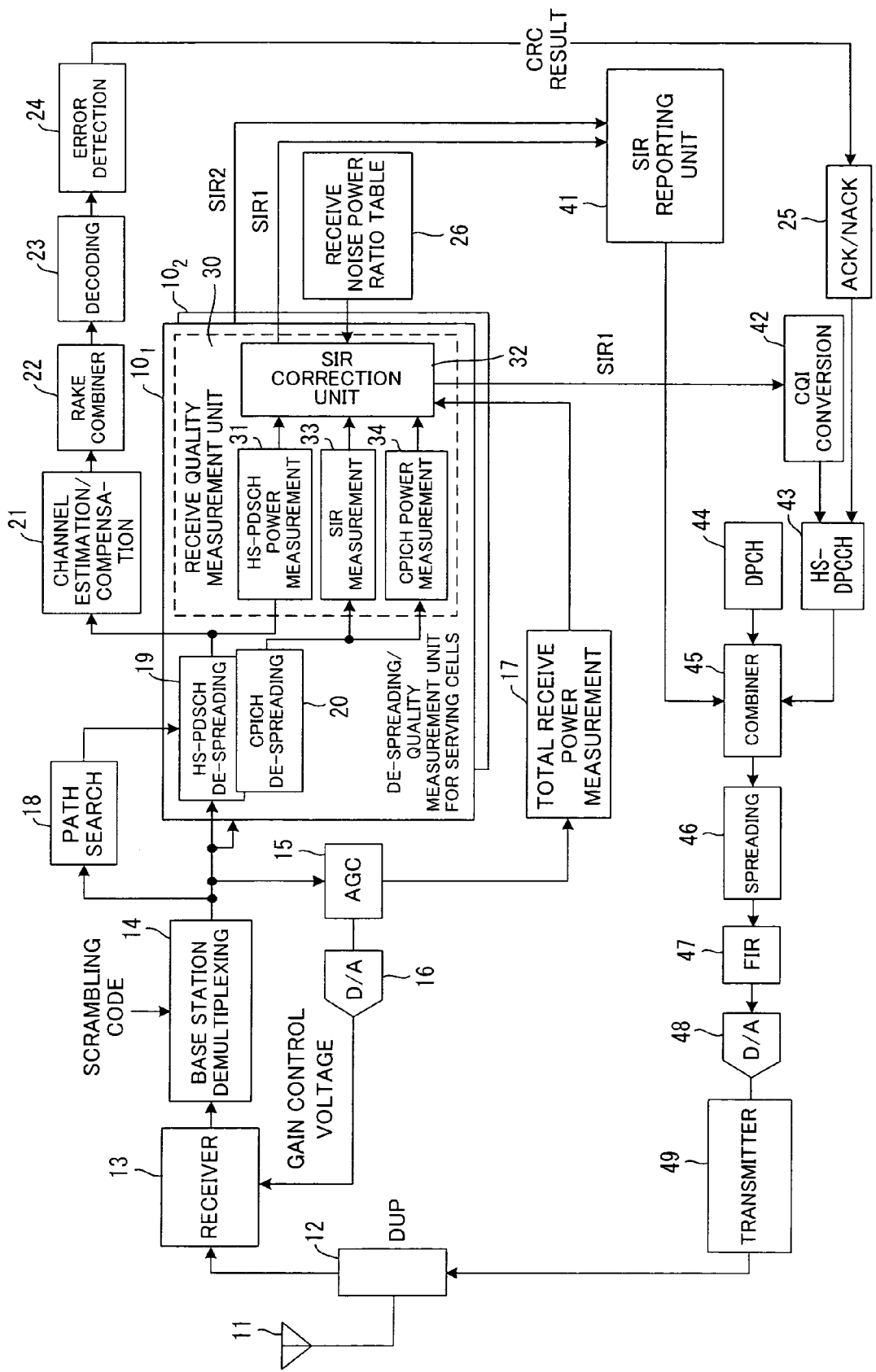
FIG. 1 is a block diagram depicting the mobile station of a first embodiment.
Figure 2:
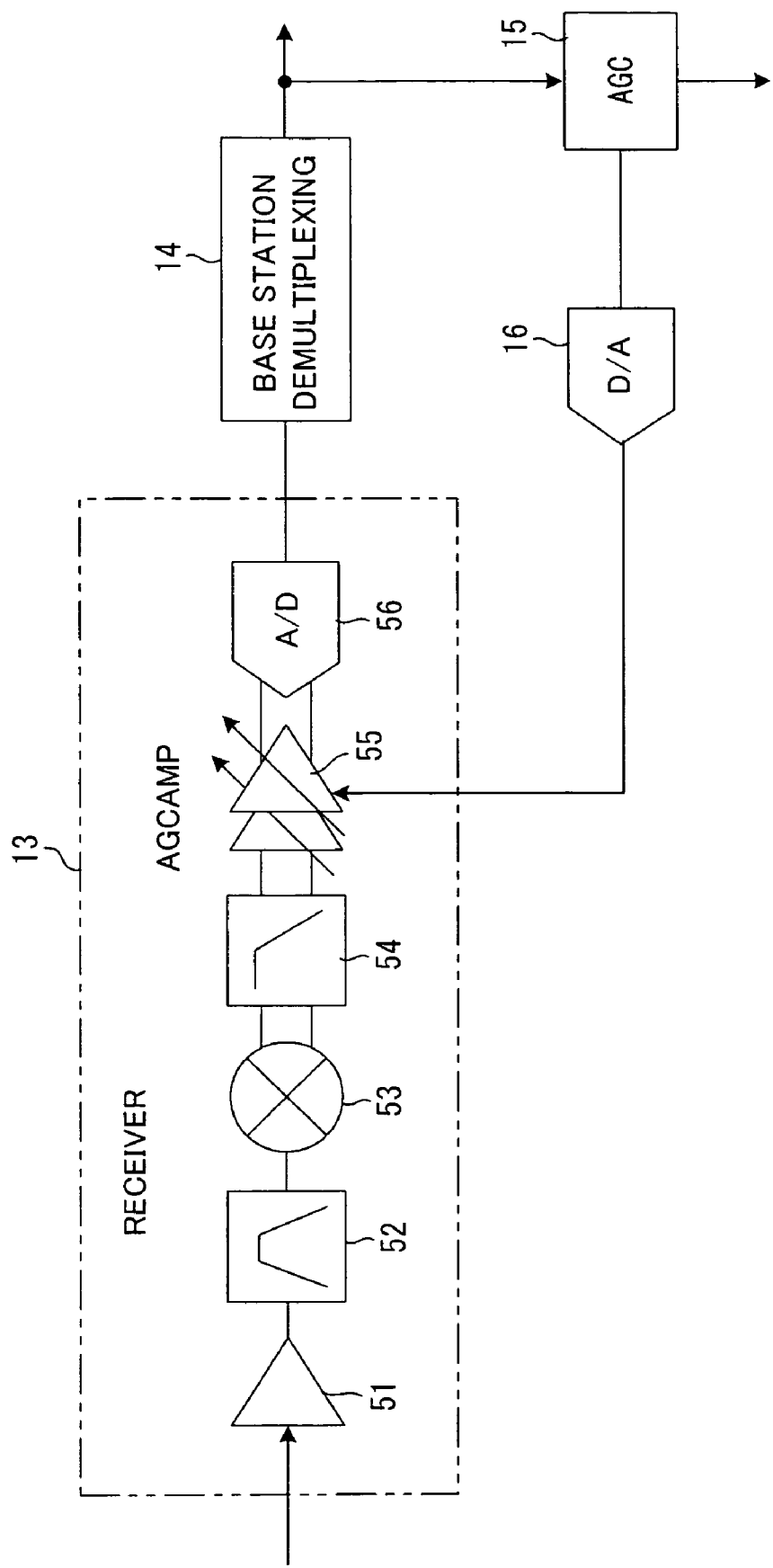
FIG. 2 is a block diagram depicting the receiver.

FIG. 1 is a block diagram depicting the mobile station of the present invention. The signal transmitted from the base station is input to the receiver 13 via the antenna 11 and the duplexer 12. As FIG. 2 shows, the receiver 13 comprises the high frequency amplifier 51, band pass filter 52 for limiting the band, frequency conversion unit 53 for converting RF signals into base band signals in frequency, low pass filter 54 for limiting the high band, gain variable amplifier 55 and AD converter 56 for converting input signals into analog signals.

The base station demultiplexing unit 14 multiplies the receiver output signal by the scrambling code of the serving cell or the adjacent non-serving cell (de-spreading) when necessary, demultiplexes the signals from a base station of each cell; and outputs them. The AGC control unit 15 determines the gain control value of the gain variable amplifier 55 (FIG. 2), so that the signal level to be received from the base station becomes the set level, and inputs the gain control value to the gain variable amplifier 55 via the DA converter 16. The gain control value of the AGC control unit 15 corresponds to the total receive power from the base station. Therefore the total receive power measurement unit 17 has a conversion table between the gain control value and the total receive power, and determines the total receive power from this table based on the AGC control value which is input from the AGC control unit 15, and outputs it.

The path search unit 18 multiplies the signal received from the base station of the serving cell by the spreading code (channelization code), detects the multi-path, and inputs the path timing to the HS-PDSCH de-spreading unit 19 and the CPICH de-spreading unit 20 of the de-spreading/quality measurement unit $10_1$, for serving cells. The HS-PDSCH de-spreading unit 19 de-spreads at each path timing of the multi-path which was input, and the channel estimation/compensation unit 21 estimates a channel and performs channel compensation on the HS-PDSCH de-spreading signal based on this channel estimation value. The rake combiner 22 combines the de-spreading signal to be output at each path timing where channel compensation was performed, and the decoding unit 23 demodulates and decodes the rake combination signal, and the error detection unit 24 detects errors by the CRC operation, and outputs the CRC result. The ACK/NACK generation unit 25 generates the ACK/NACK signal based on the CRC check result. In the receive noise power ratio table 26 of a storage unit, the receive noise power ratio which is a ratio of the internal noise power and the total receive power of the receiver, is measured and set in advance.

The HS-PDSCH power measurement unit 31 in the receive quality measurement unit 30, which is a communication environment measurement unit, measures the HS-PDSCH power using the output signal of the HS-PDSCH de-spreading unit 19, and inputs it to the SIR correction unit 32, the SIR measurement unit 33 measures SIR at the time when data is received via HS-PDSCH, and inputs it to the SIR correction unit 32, and the CPICH power measurement unit 34 measures the CPICH power using the output signal of the CPICH de-spreading unit 20, and inputs it to the SIR correction unit 32. The SIR correction unit 32 executes correction control of the SIR using the total receive power, HS-PDSCH power, SIR, CPICH power and receive noise power ratio, and inputs the corrected SIR (=SIR1) after correction to the SIR report unit 41 and also to the CQI conversion unit 42. The correction control of the SIR is detailed hereinafter.

The receive quality measurement unit 30 has a configuration for measuring and cottecting the SIR of serving cells, but the receive quality measurement unit 30 (not shown in FIG. 1) installed in the de-spreading/quality measurement unit 10₂ for non-serving cells requires only the SIR measurement unit 33, and this SIR measurement unit 33 measures SIR in accordance with a method later mentioned, and inputs it to the SIR reporting unit 41 as SIR2.

The SIR reporting unit 41 transmits the measured SIR1 and SIR2 to the RNC (Radio Network Controller) via the logical channel DCCH (Dedicated Control Channel), which is a higher layer. The CQI conversion unit 42 converts the SIR1 into a CQI value which regulates the block error rate BLER not to exceed 0.1, and the HS-DPCCH mapping unit 43 maps the CQI value and the ACK/NACK in the subframe of the HS-DPCCH, and sends it to the base station. The DPCH mapping unit 44 maps the individual data in the dedicated physical channel (DPCH), and sends it to the base station.

The synthesis unit 45 synthesizes the DCCH signal, HS-DPCCH signal and DPCH signal, the synthesized signal is spread by the scrambling code in the spreading unit 46, and is input to the transmitter 49 via the FIR filter 47 and DA converter 48. The transmitter 49 converts the base band signal into a high frequency signal, and transmits it to the base station via the duplexer 12 and antenna 11.

Measurement of SIR

Figure 3:
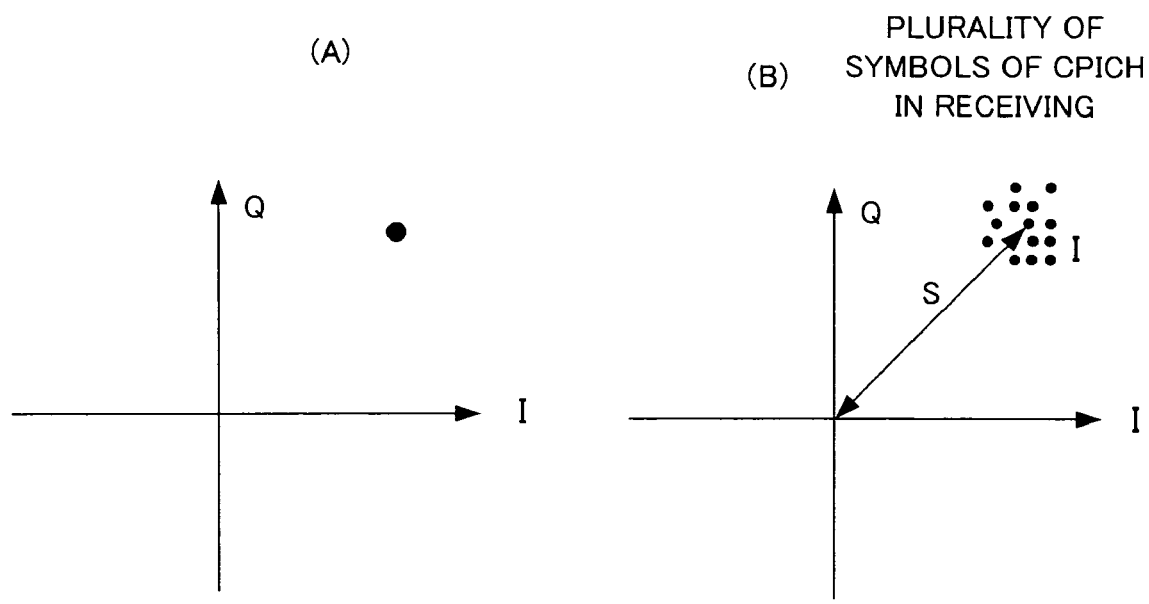
FIG. 3 are diagrams depicting the SIR measurement method of the SIR measurement unit.

FIG. 3 describes the SIR measurement method of the SIR measurement unit 33. The constellation of the CPICH exists at a predetermined position of the I-Q complex plane at the transmission side, as shown in (A) of FIG. 3. The constellation of the CPICH scatters at the receive side, as shown in (B) of FIG. 3, influenced by noise. The average value of the receive CPICH is the signal component S where the dispersion from the average is the interference component I, and the ratio of the signal component S and the interference component I is SIR.

When the de-spreading signal at the m-th path, with respect to the n-th pilot symbol at the k-th slot is expressed by $r_m(n, k)$, the average thereof of the Np symbols is given by the following expression.

$$\bar{r}_m(k) = \frac{1}{Np} \sum_{n=0}^{Np} r_m(n, k)$$

Here m is $1 \leq m \leq M$ (M is a number of paths of the multi-path). Also the average power of the pilot signals is given by the following expression.

$$\tilde{S}_m(k) = |\bar{r}_m(k)|^2$$

The power (interference power) of the difference between the average of the pilot signals and each pilot signal is given by the following expression.

$$\tilde{I}_m(k) = \frac{1}{Np} \sum_{n=0}^{Np} |r_m(n, k) - \bar{r}_m(k)|^2$$

To improve accuracy, the slot average of the interference power is determined by the following expression, $$\bar{I}_m(k) = \mu \bar{I}_m(k-1) + (1-\mu) \tilde{I}_m(k)$$

and the average of the ratio of the respective S and I of all the paths is calculated by the following expression, $$SIR(k) = 10 \log_{10} \left\{ \frac{1}{M} \sum_{m=0}^{M} \frac{\tilde{S}_m(k)}{\bar{I}_m(k)} \right\}$$

then the SIR of the k-th slot is determined.

SIR Measurement Control in Serving Cells

Figure 4:
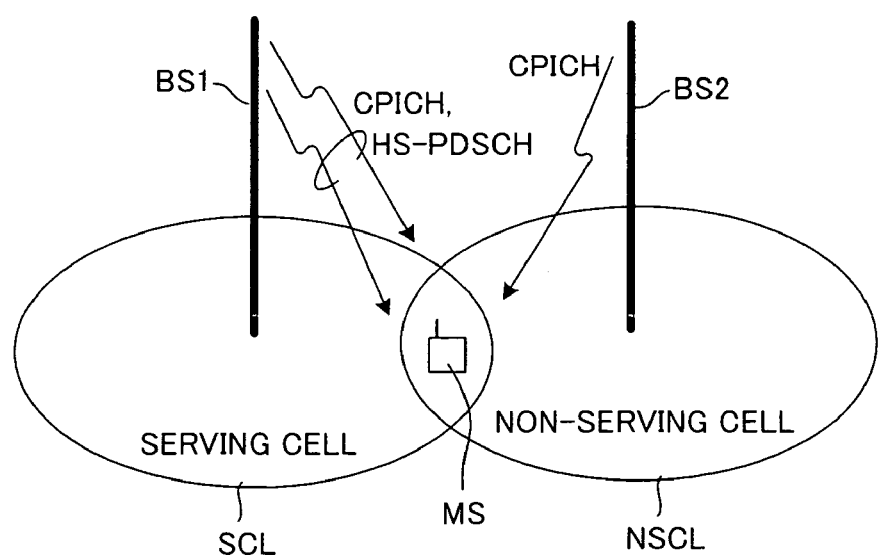
FIG. 4 is a diagram depicting the handover status.

As FIG. 4 shows, when the mobile station MS enters the boundary area between the serving cell SCL and the non-serving cell NSCL, the handover status is generated, where the SIR of the signal received from the base stations BS1 and BS2 of each cell is measured, and is sent to the RNC (Radio Network Controller).

Figure 5:
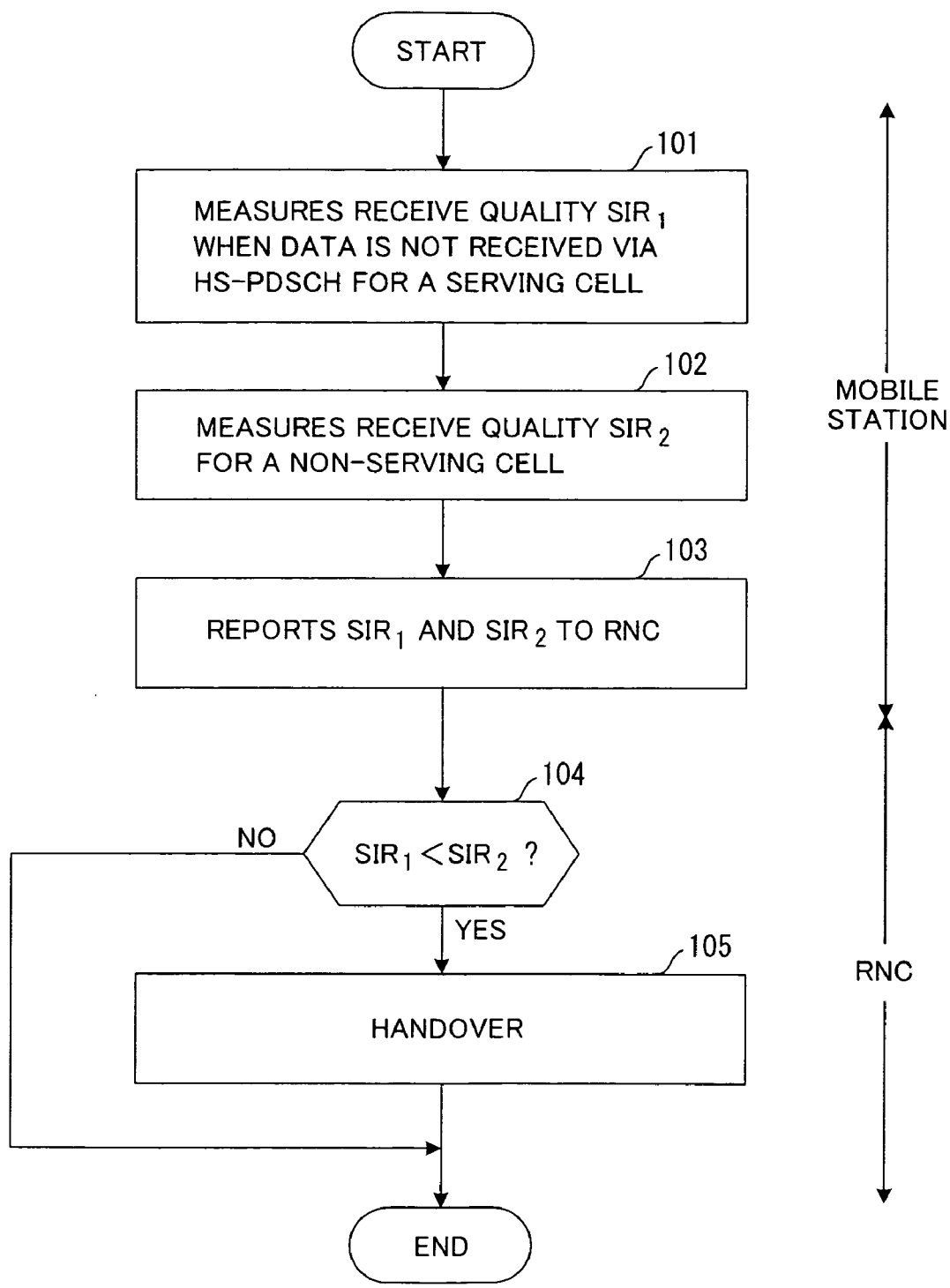
FIG. 5 is a flow chart depicting the handover control according to the first embodiment.
Figure 19:
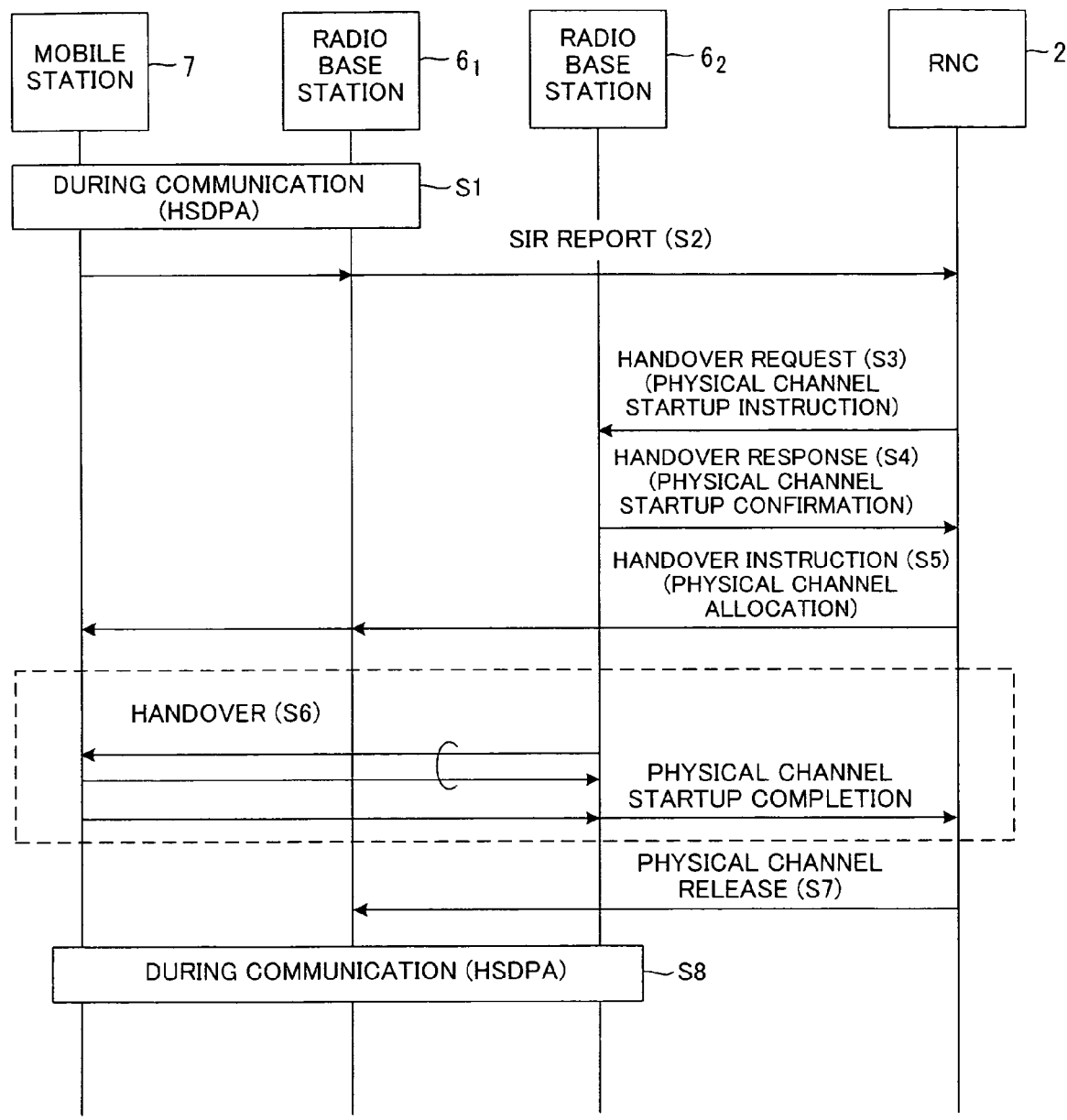
FIG. 19 is a diagram depicting the handover sequence.
Figure 20:
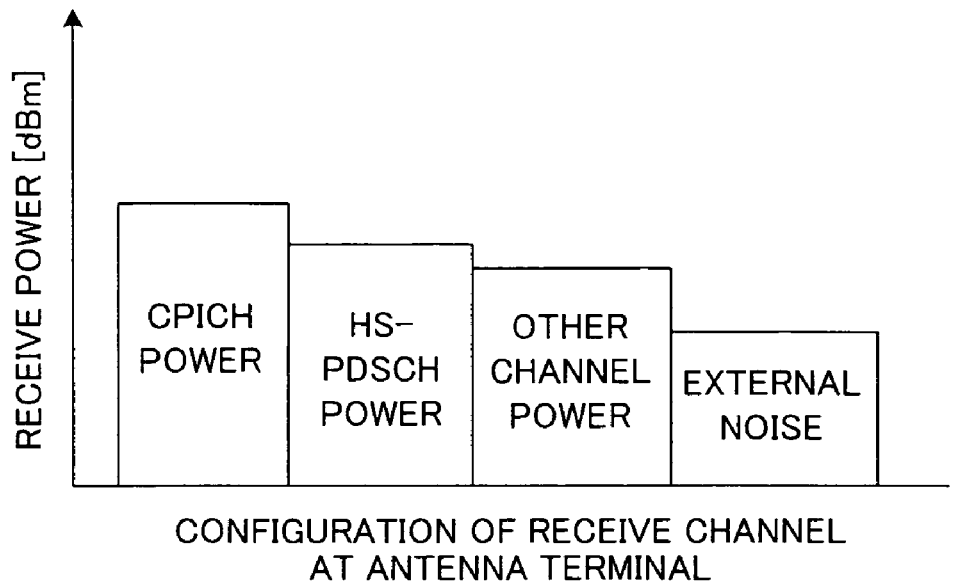
FIG. 20 is a diagram depicting the power of signals received at the antenna terminal.
Figure 21:
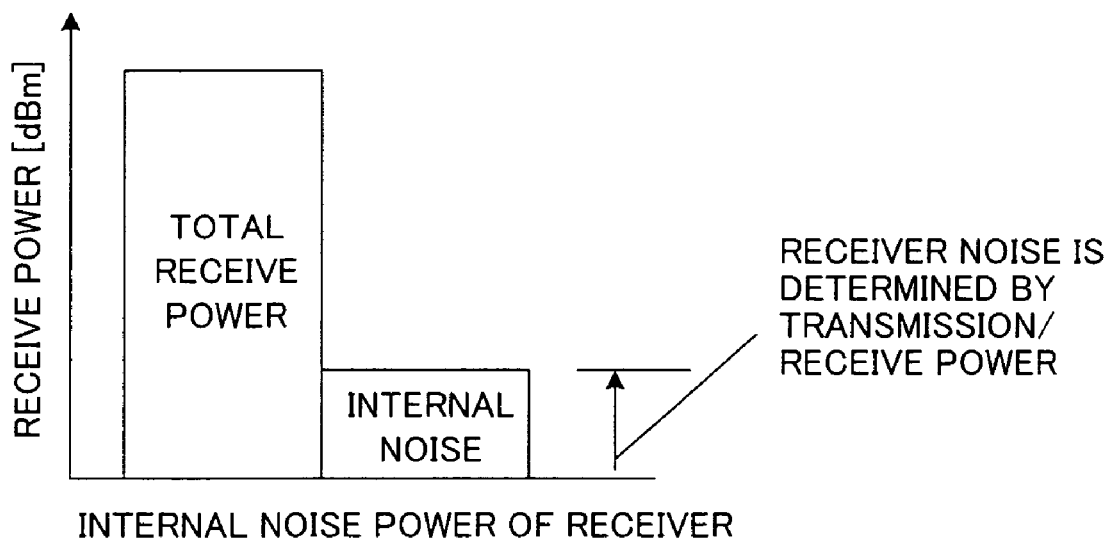
FIG. 21 is a diagram depicting the internal noise according to the total receive power.
Figure 22:
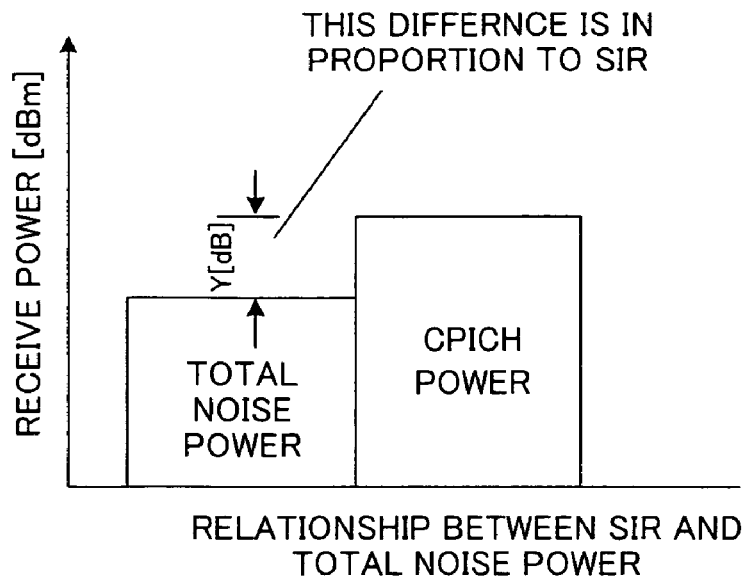
FIG. 22 is a diagram depicting an SIR which is a ratio of the CPICH power and the total noise power.
Figure 23:
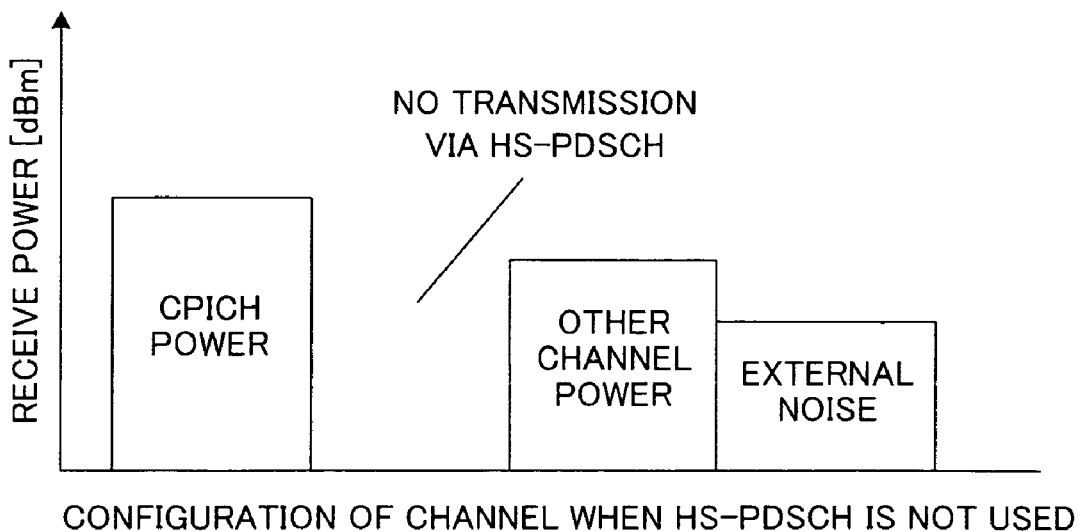
FIG. 23 is a diagram depicting the powers when the signal via HS-PDSCH is not received.
Figure 24:
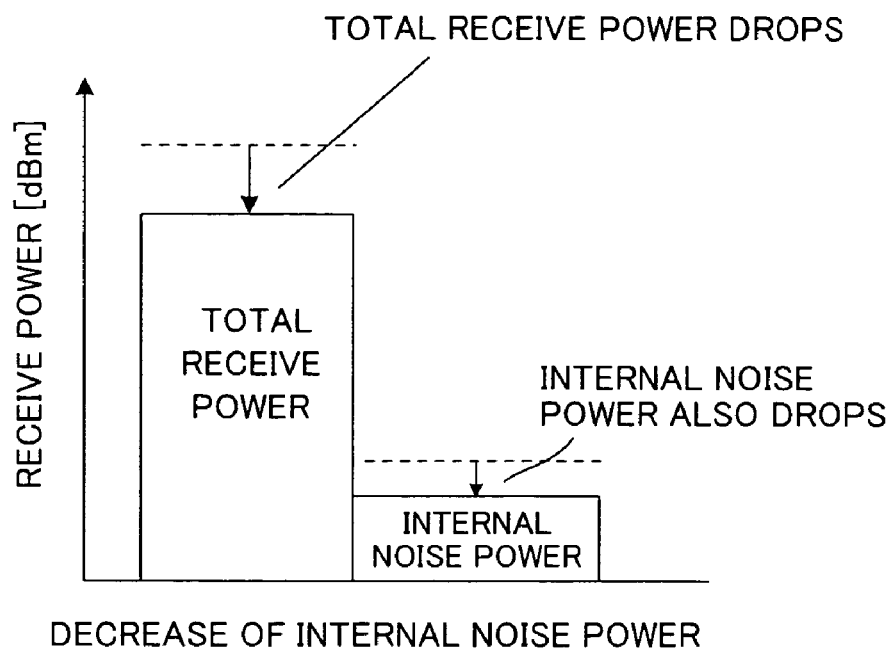
FIG. 24 is a diagram depicting the internal noise power when the power of HS-PDSCH is not used.
Figure 25:
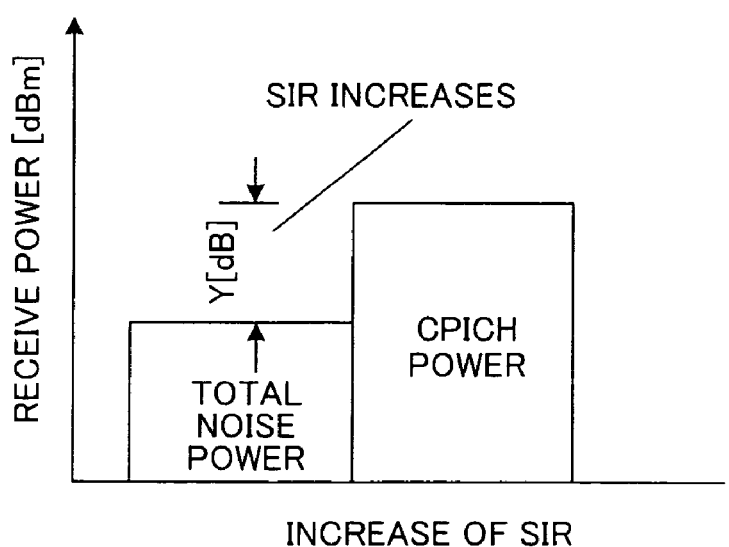
FIG. 25 is a diagram depicting the SIR when the power of HS-PDSCH is not used.

FIG. 5 is a flow chart depicting the handover control of the first embodiment. In the handover status, the mobile station MS measures the receive quality SIR1 on the assumption that data is not received from the serving cell SCL via HS-PDSCH (step 101). Then the mobile station MS measures the receive quality SIR2 for the non-serving cell NSCL (step 102), and reports SIR1 and SIR2 to the RNC device respectively via the logical channel DCCH (step 103). The RNC compares the values of SIR1 and SIR2 (step 104), and sends a handover request to the base station BS2 of the non-serving cell (NSCL) if SIR1<SIR2, and executes handover hereafter according to the sequence shown in FIG. 19 (step 105).

Figure 6:
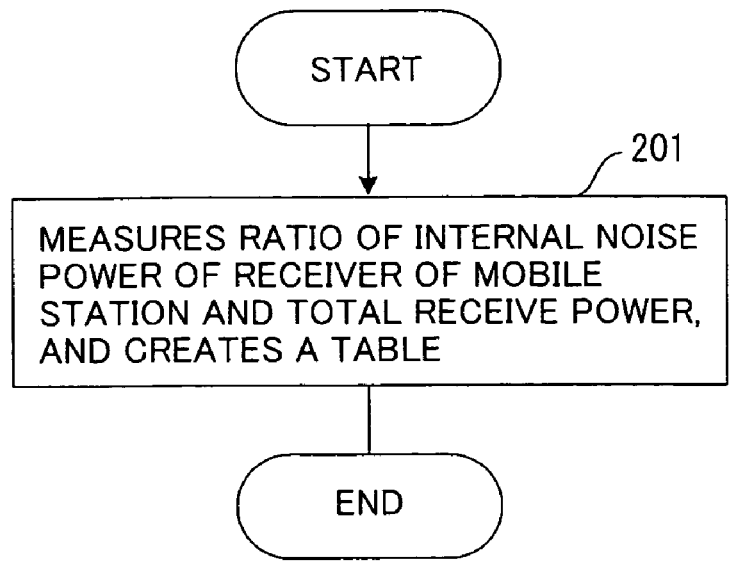
FIG. 6 is a flow chart depicting the processing of the measuring ratio of the internal noise power and the total receive power in the receiver of the mobile station, and the creating and saving of the table of the receive noise power ratio with respect to the total receive power.
Figure 7:
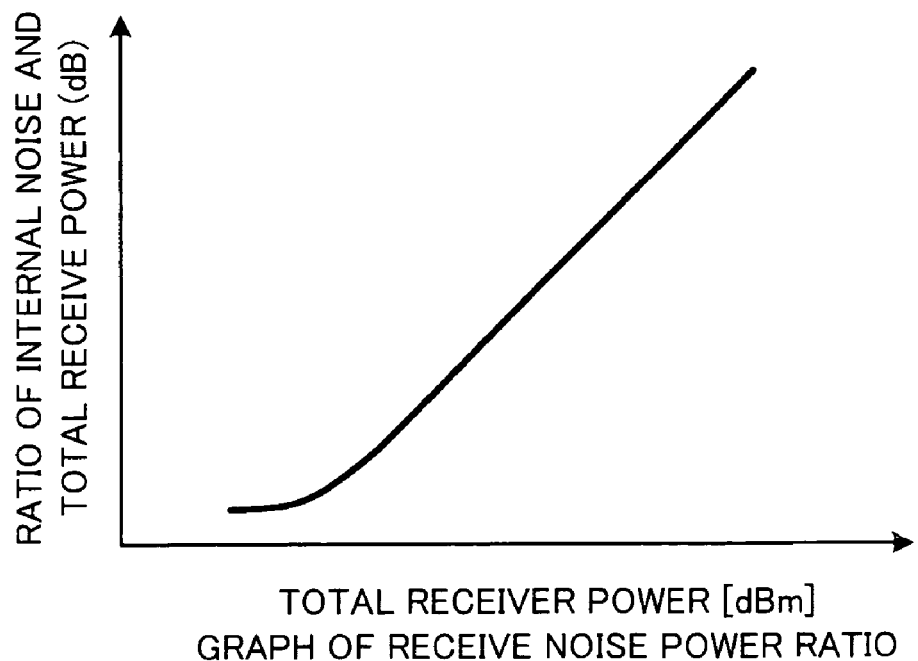
FIG. 7 is a graph depicting the characteristics of the receive noise power ratio.

When the receive quality SIR1 in the serving cell SCL is measured, the ratio of the internal noise power and the total receive power of the receiver of the mobile station is measured in advance according to FIG. 6, and the ratio of the internal noise power to the total receive power is created and stored in the receive noise power ratio table 26 of the storage unit (FIG. 1) (step 201). FIG. 7 is a graph depicting the characteristics of the receive noise power ratio, which corresponds to Expression (2). This is required to measure the receive quality SIR1 on the assumption that the data is not received via HS-PDSCH.

Figure 8:
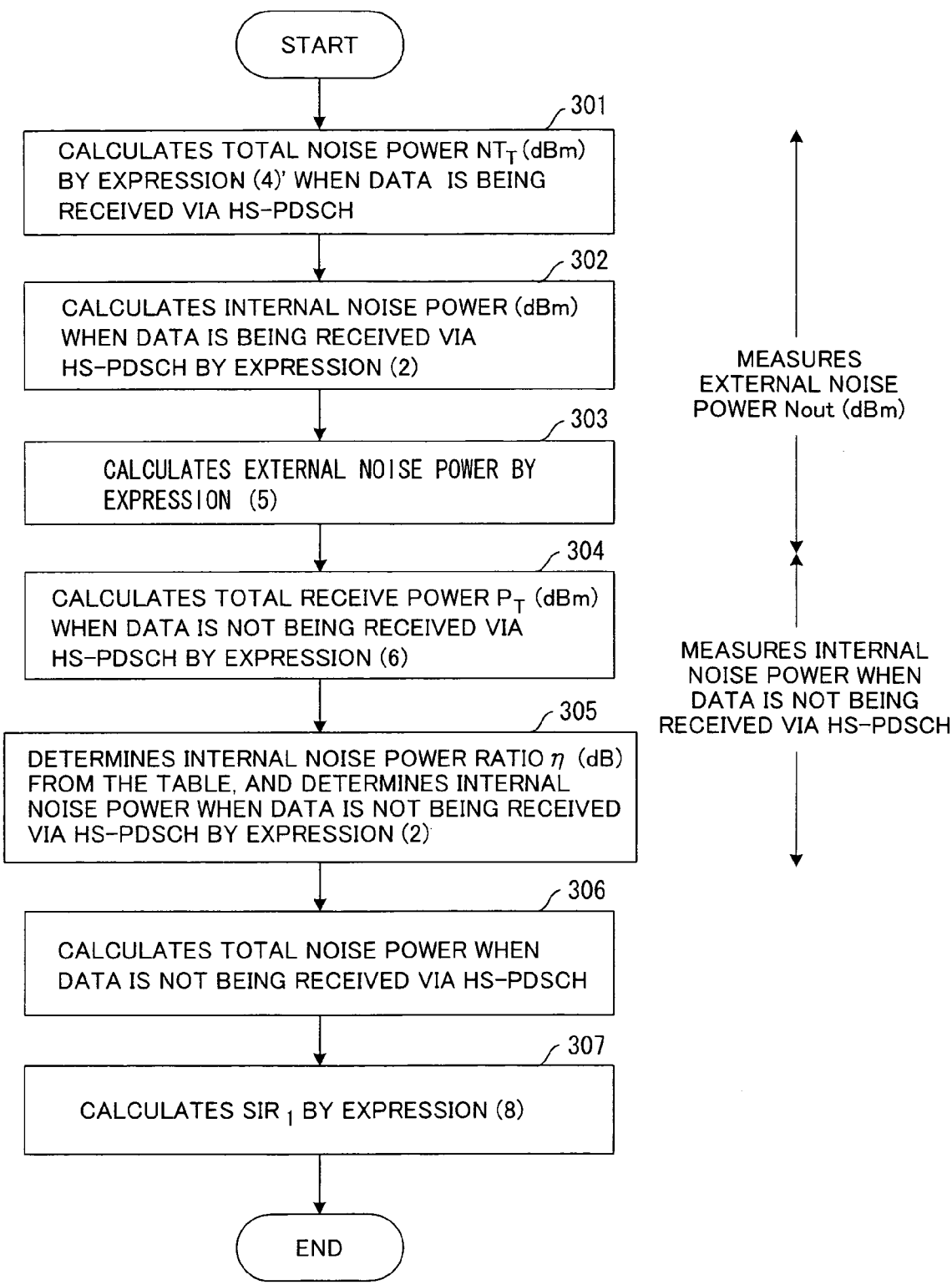
FIG. 8 is a flow chart depicting the measurement processing of the receive quality SIR1 when data is not being received from the serving cell via HS-PDSCH.

FIG. 8 is a flow chart depicting the receive quality SIR1 measurement processing on the assumption that data is not being received via HS-PDSCH for the serving cell SCL. First the total noise power $N_T$ (dBm), when data is being received via HS-PDSCH, is calculated by the following expression, which is expression (4) modified, that is Total noise power $N_T$ [dBm]=$CPICH$ power [dBm]−
   $SIR$ [dB]+$CPICH$ spreading gain [dB]  (4)′

(step 301). The CPICH power and SIR can be measured by the mobile station, and the CPICH spreading gain is a known value, so $N_T$ [dBm] can be derived from these values.

Now the internal noise power is calculated by expression (2), when data is being received via HS-PDSCH, that is Internal noise power [dBm]=total receive power
[dBm]−internal noise power ratio [dB]   (2)

(step 302). This expression can be calculated by finding the internal noise power ratio [dB] from the receive noise power ratio table 26, which is measured and stored in advance in step 201.

Then the external noise power is calculated from the total noise power $N_T$ [dBm] and the internal noise power using the following expression, that is External noise power [mW]=$10^{(NT[dBm]/10)}$−internal
noise power [mW]   (5)

(step 303). This external noise power is constant without depending on whether data is received via HS-PDSCH or not, this means that the external noise power when data is not being received via HS-PDSCH is determined here.

After calculation of the external noise power ends, the internal noise power when data is not being received via HS-PDSCH is calculated. First the total receive power PT' [dBm] is calculated by the following expression Total receive power PT' [dBm]=10 $\log_{10}$ {total
receive power [mW]−HS-PDSCH power [mW]}   (6)

(step 304). Then the internal noise power ratio [dB] corresponding to the total receive power PT' [dBm], is determined from the receive noise power ratio table 26, and the internal noise power when data is not being received via HS-PDSCH is calculated by expression (2) (step 305).

If the internal noise power and external noise power when data is not being received via HS-PDSCH are determined, then the total noise power [dBm] when data is not being received via HS-PDSCH is calculated by the following expression.

Total noise power [dBm]=10 $\log_{10}$ {external noise
power[mW]+internal noise power[mW]}   (7)

(step 306), and from this result, SIR1, when data is not being received via HS-PDSCH, is calculated by the following expression SIR1 [dB]=CPICH power [dBm]−total noise power
[dBm]+CPICH spreading gain [dB]   (8)

This SIR1 is used for handover control.

According to the first embodiment, the SIR of the receive signals from a serving cell is measured, on the assumption that data is not being received via HS-PDSCH. As a result, the SIR measurement condition for the serving cell can be same as the SIR measurement condition of the non-serving cell, and SIRs can be correctly compared, so unnecessary handover can be avoided and a drop in the communication throughput can be prevented.

(B) Second Embodiment

In the first embodiment, SIR is estimated in a serving cell on assumption that data is not being received via HS-PDSCH, so that SIR can be measured and compared under the identical conditions for a serving cell and non-serving cell. In the second embodiment, SIR is estimated on assumption that data is being received from a non-serving cell via HS-PDSCH, so that SIR can be measured and compared under the identical conditions for a serving cell and non-serving cell.

Figure 9:
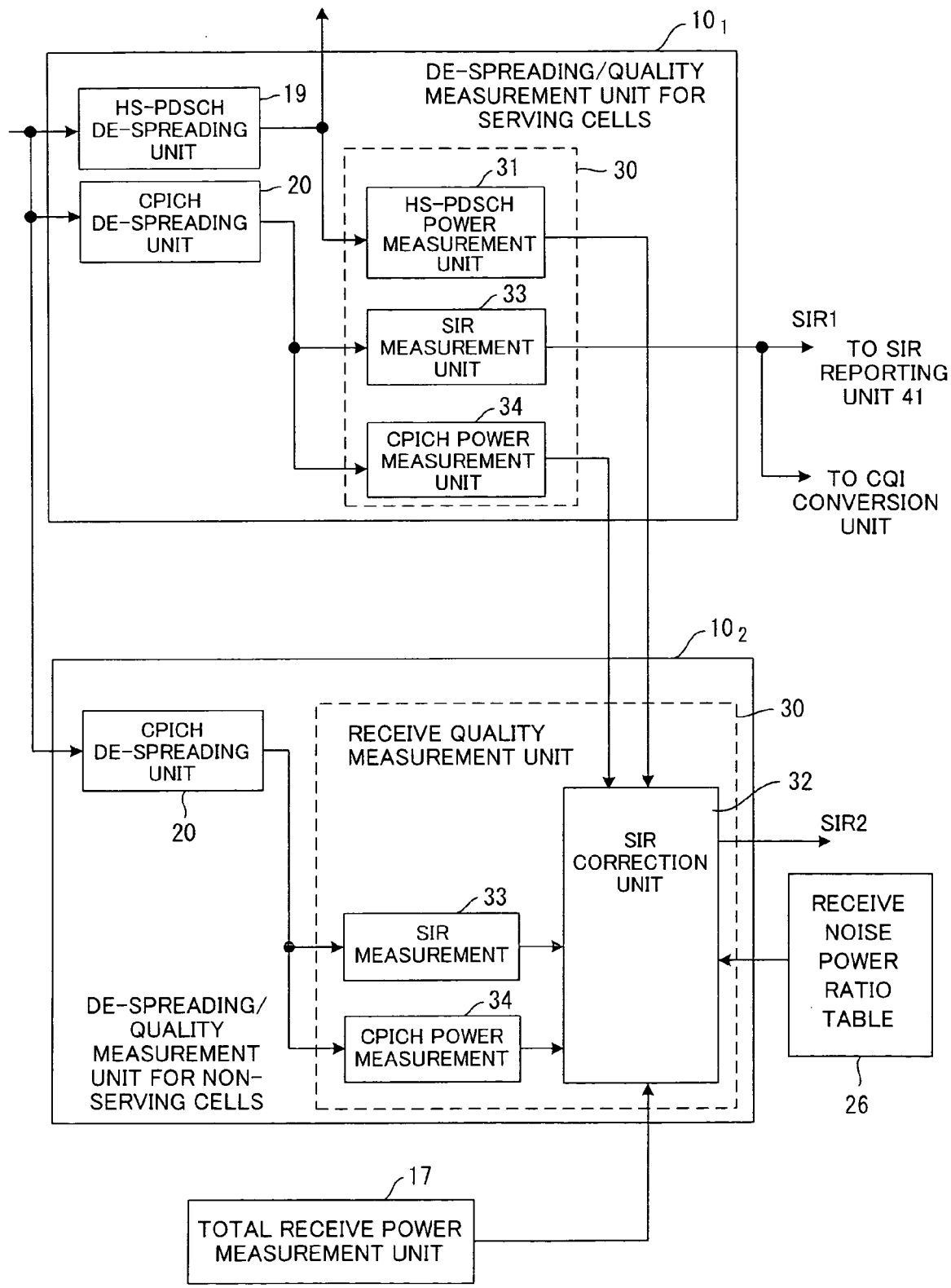
FIG. 9 is a block diagram depicting the de-spreading/ quality measurement unit for serving the cells and non-serving cells of a second embodiment.

FIG. 9 is a block diagram depicting the de-spreading/quality measurement units $10_1$ and $10_2$ of the serving cell and non-serving cell according to the second embodiment, where the elements that are same as the elements in the despreading/quality measurement unit in FIG. 1 are denoted with the same reference numerals. The differences are:

(1) the SIR correction unit 32 is removed from the de-spreading/quality measurement unit $10_1$ of the serving cell, and SIR measured by the SIR measurement unit 33 is output as SIR1;

(2) HS-PDSCH power and CPICH power are input to the SIR correction unit 32 of the de-spreading/quality measurement unit $10_2$ of the non-serving cell;

(3) the HS-PDSCH de-spreading unit 19 and the HS-PDSCH power measurement unit 31 are removed from the de-spreading/quality measurement unit $10_2$ of the non-serving cell; and (4) the SIR correction unit 32 of the de-spreading/quality measurement unit $10_2$ of the non-serving cell estimates and outputs SIR when data is being received via HS-PDSCH from the non-serving cell.

Figure 10:
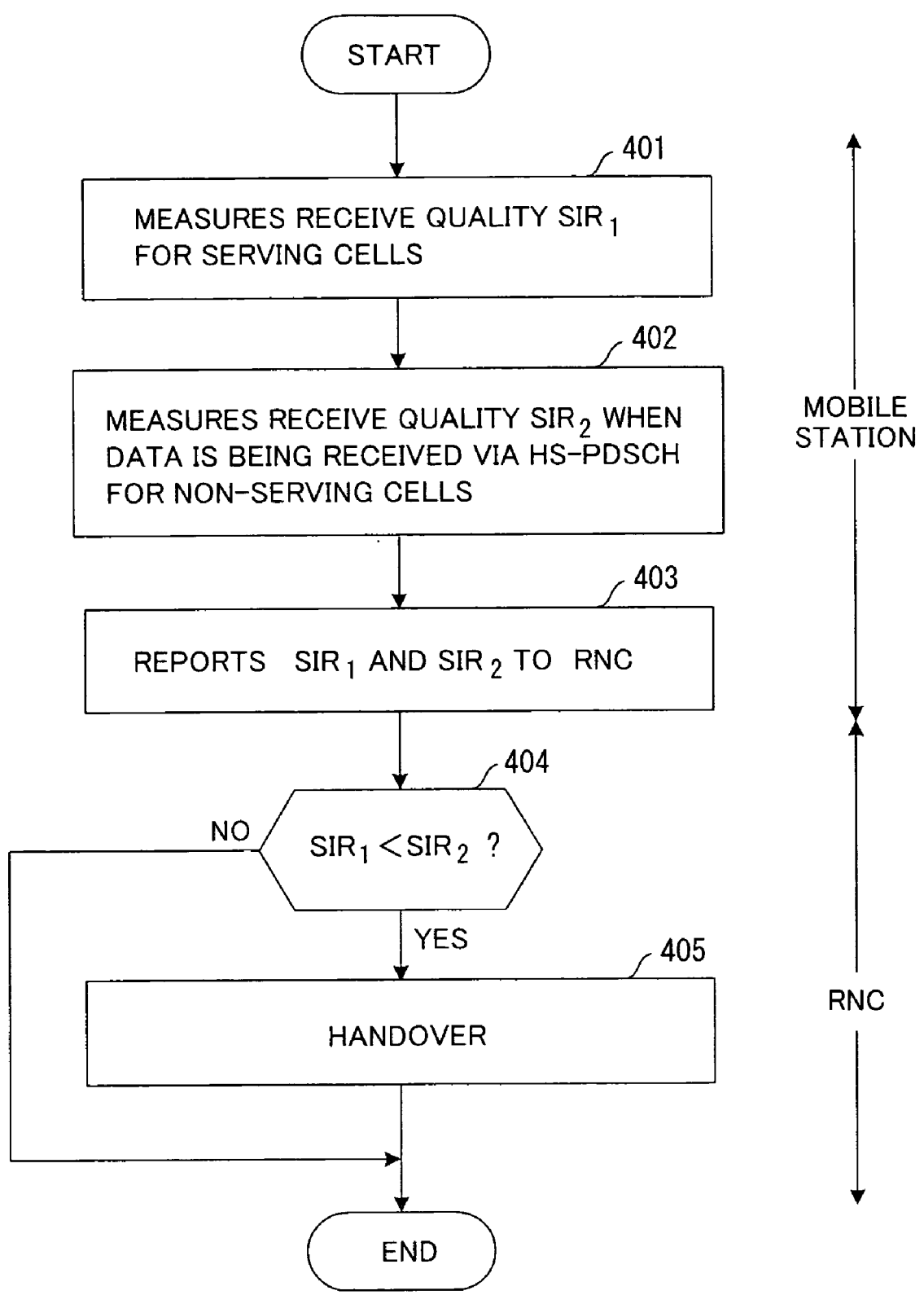
FIG. 10 is a flow chart depicting the handover control according to the second embodiment.

FIG. 10 is a flow chart depicting the handover control according to the second embodiment. In handover status, the mobile station measures the receive quality SIR1 for the serving cell SCL (FIG. 4) (step 401). Then the mobile station measures the receive quality SIR2 on assumption that data is being received from the non-serving cell NSCL via HS-PDSCH (step 402), and reports each SIR1 and SIR2 to the RNC device via the logical channel DCCH (step 403). RNC compares the values of SIR1 and SIR2 (step 404), and sends the handover request to the base station BS2 of the non-serving cell NSCL if SIR1<SIR2, and then performs handover according to the sequence shown in FIG. 19 (step 405).

Figure 11:
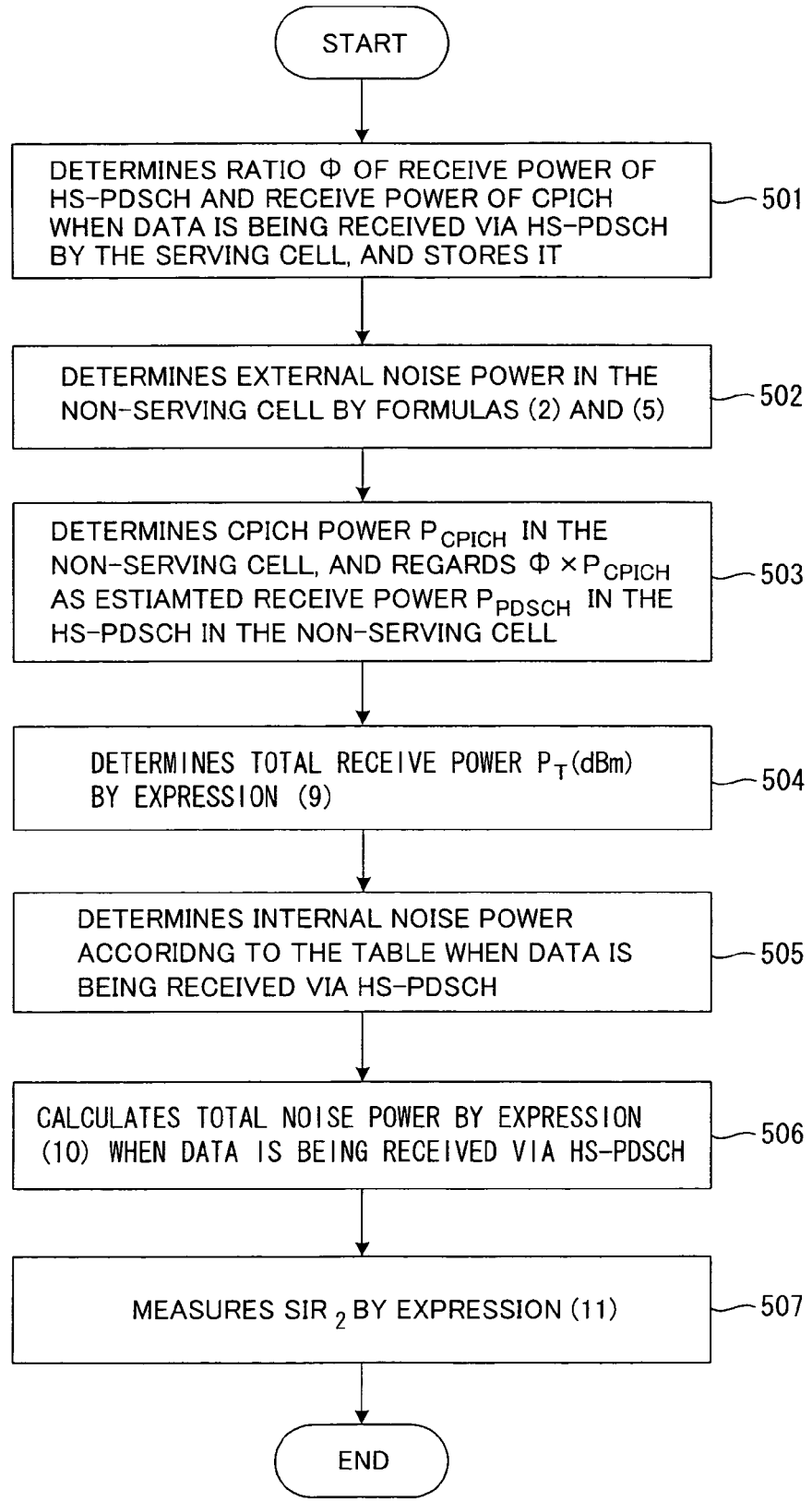
FIG. 11 is a flow chart depicting the receive quality SIR2 measurement processing when data is being received from a non-serving cell via HS-PDSCH.

FIG. 11 is a flow chart depicting the receive quality SIR2 measurement processing on assumption that data is being received via HS-PDSCH from the non-serving cell NSCL (FIG. 4).

The SIR correction unit 32 determines the ratio φ of the HS-PDSCH power and the CPICH power of the serving cell to be input from the de-spreading/quality measurement unit $10_1$ of the serving cell, and stores it (step 501). Then the SIR correction unit 32 determines the internal noise power and the external noise power in the non-serving cell by Expressions (2) and (5) (step 502).

After the internal noise power and the external noise power are determined, the CPICH power $P_{CPICH}$ [mW] in the non-serving cell is determined, and φ×$P_{CPICH}$ [mW] is estimated as the HS-PDSCH power on assumption that data is being received via HS-PDSCH in the non-serving cell (step 503). Then the total receive power is calculated by the following expression, that is Total receive power [dBm]=10 $\log_{10}$ {total receive
power [mW]+φ×$P_{CPICH}$ [mW]}   (9)

(step 504). Then the internal noise power is determined using the receive noise power ratio table 26 (step 505), and the total noise power [dBm] is calculated by the following expression Total noise power [dBm]=10 $\log_{10}$ {external noise
power[mW]+internal noise power [mW]}(10)

(step 506). Finally SIR2 is calculated by the following expression on the assumption that data is being received from the non-serving cell via HS-PDSCH that is, SIR2 [dB]=CPICH power [dBm]−total noise power
[dBm]+CPICH spreading gain [dB]   (11)

(step 507), and this SIR2 is used for handover control.

According to the second embodiment, SIR of the receive signal from a non-serving cell is measured on the assumption that data is received from this non-serving cell via HS-PDSCH and compared with the SIR of the receive signal from the serving cell to control handover, therefore the condition of SIR measurement for the serving cell can be same as the condition of SIR measurement for the non-serving cell, and SIRs can be correctly compared, so unnecessary handover can be avoided and a drop in the communication throughput can be prevented.

(3) Third Embodiment

In the third embodiment, a mobile station demodulates HS-SCCH detects a slot which data is not being transmitted via HS-PDSCH, measures the SIR in the slot, and uses this SIR for handover, thereby the SIR measurement condition for the serving cell can be same as the condition of SIR measurement for the non-serving cell.

Figure 12:
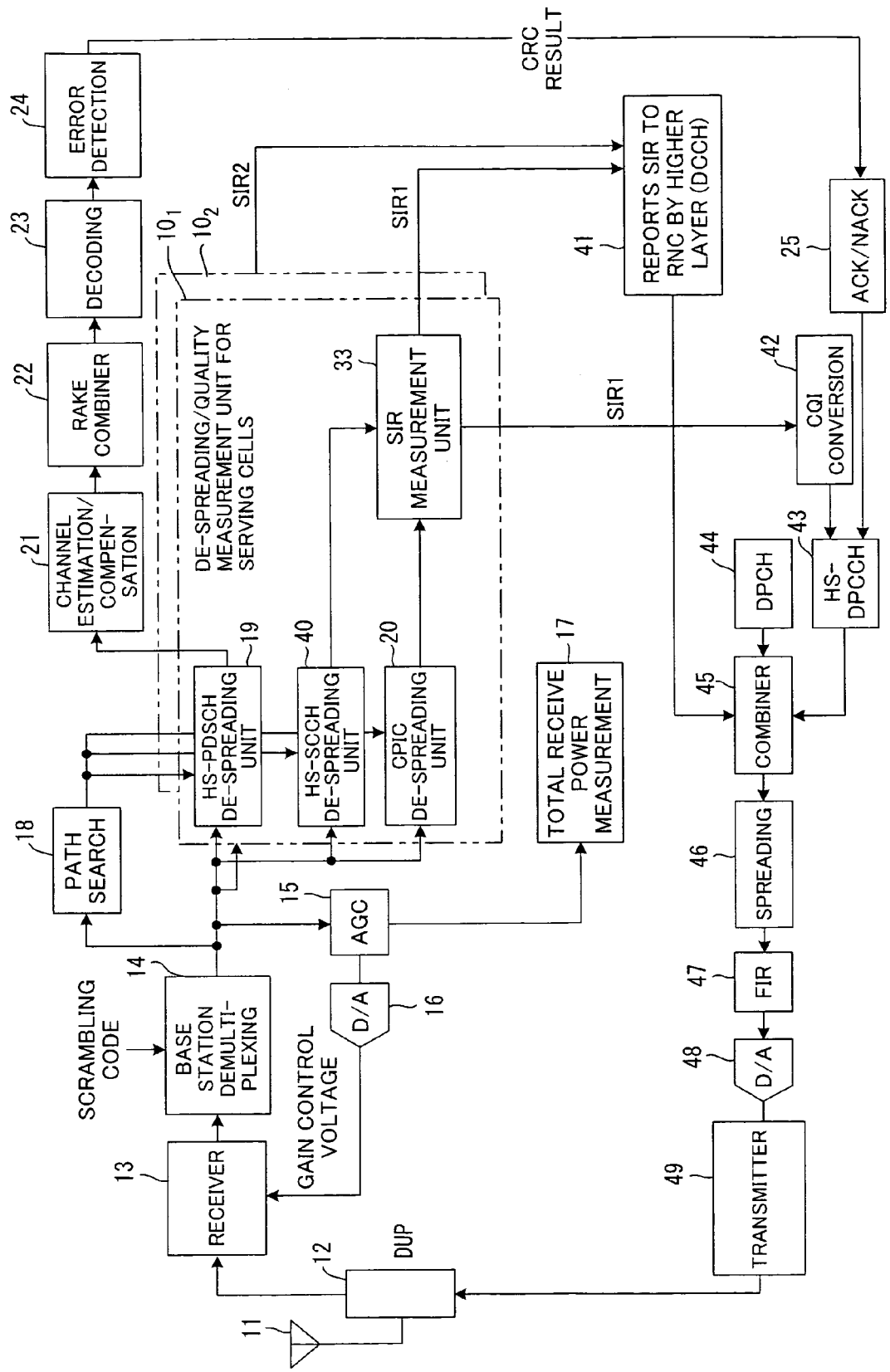
FIG. 12 is a block diagram depicting the mobile station of a third embodiment.

FIG. 12 is a block diagram of the third embodiment depicting the mobile station where elements that are same as the elements of the first embodiment in FIG. 1 are denoted with the same reference numerals. The differences are that an HS-SCCH measurement unit 40 is installed, and that the SIR measurement unit 33 measures the SIR in a slot where data is not being transmitted via HS-PDSCH, and outputs it as SIR1.

Figure 13:
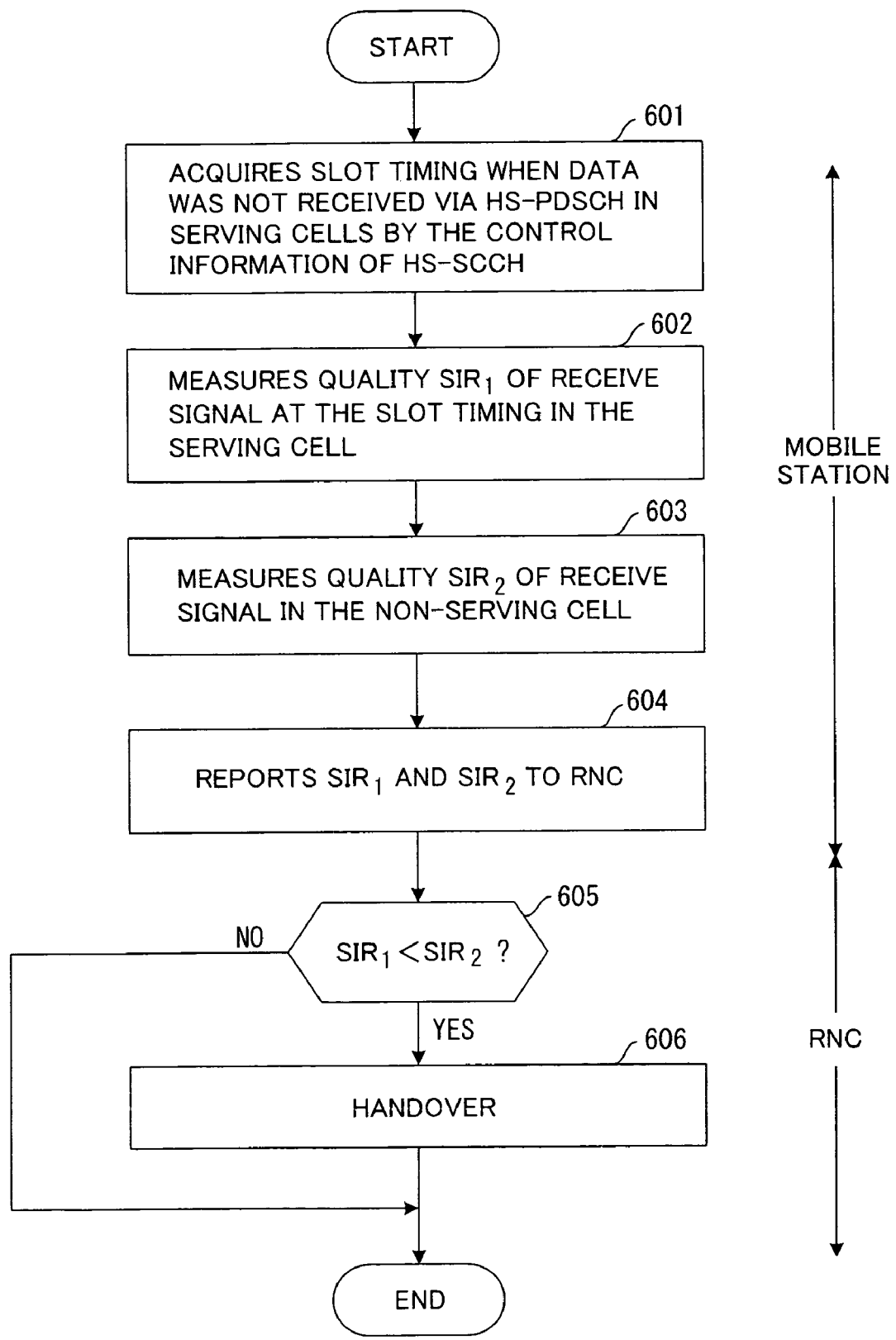
FIG. 13 is a flow chart depicting the handover control of the third embodiment.

FIG. 13 is a flow chart depicting the handover control of the third embodiment. When the handover status is generated, the mobile station demodulates the data received from the serving cell SCL via HS-SCCH, and identifies a slot which is not transmitting data via HS-PDSCH referring to the demodulated control information (step 601). Then the SIR of the receive signal at the above mentioned slot timing in the serving cell SCL is measured as SIR1 (step 602). Then the mobile station measures the receive quality SIR2 for the non-serving cell NSCL (step 603), and each SIR1 and SIR2 are reported to the RNC device via the logical channel DCCH (step 604). The RNC compares the values of SIR1 and SIR2 (step 605), transmits the handover request to the base station BS2 of the non-serving cell NSCL if SIR1<SIR2, and then handover is executed according to the sequence shown in FIG. 19 (step 606).

According to the third embodiment, SIR can be measured when data is not being received from the serving cell via HS-PDSCH, and SIR measurement conditions can be the same for the serving cell and the non-serving cell, therefore SIRs can be compared at high precision.

Variant Form

Figure 14:
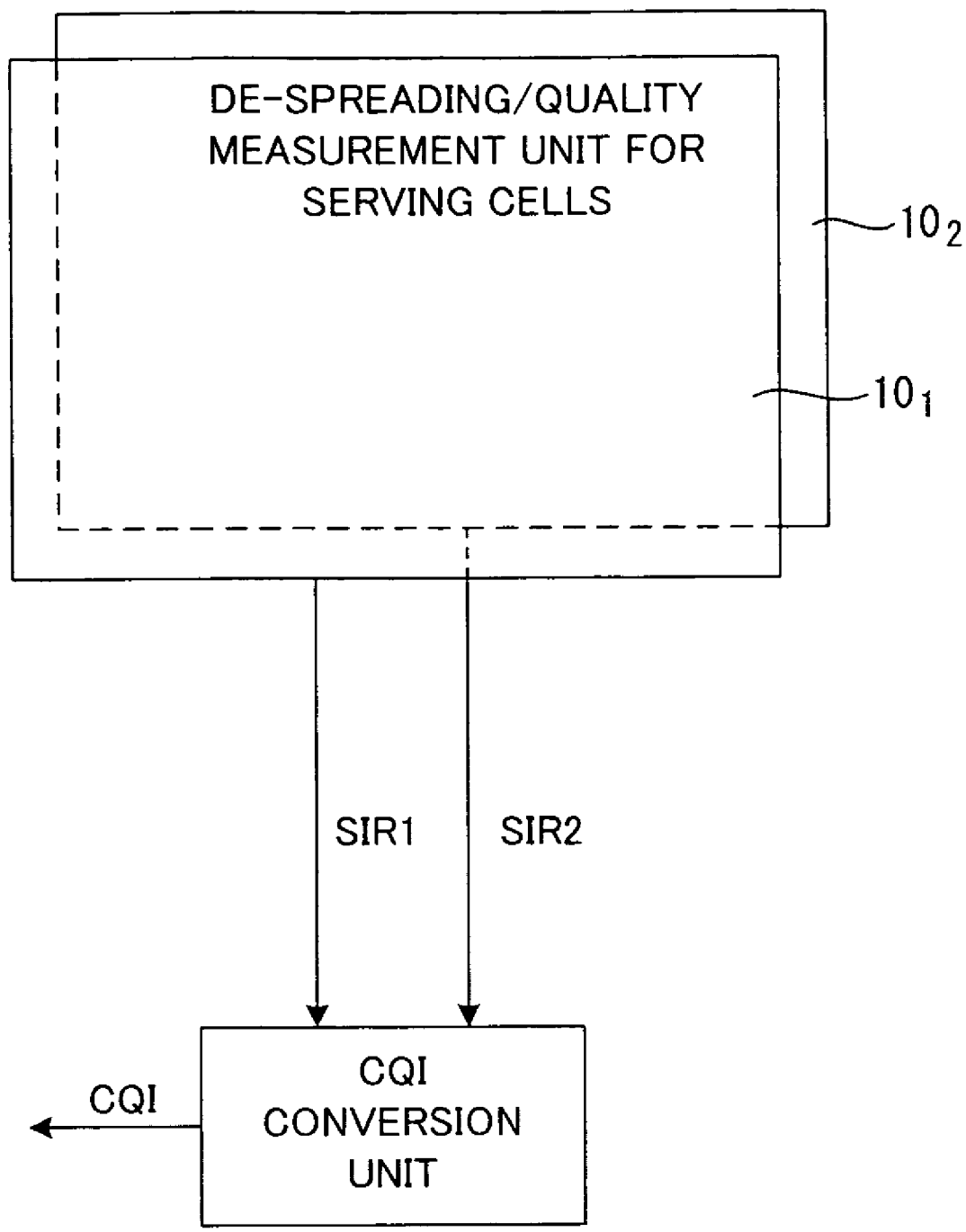
FIG. 14 is a diagram depicting a variant form.
Figure 15:
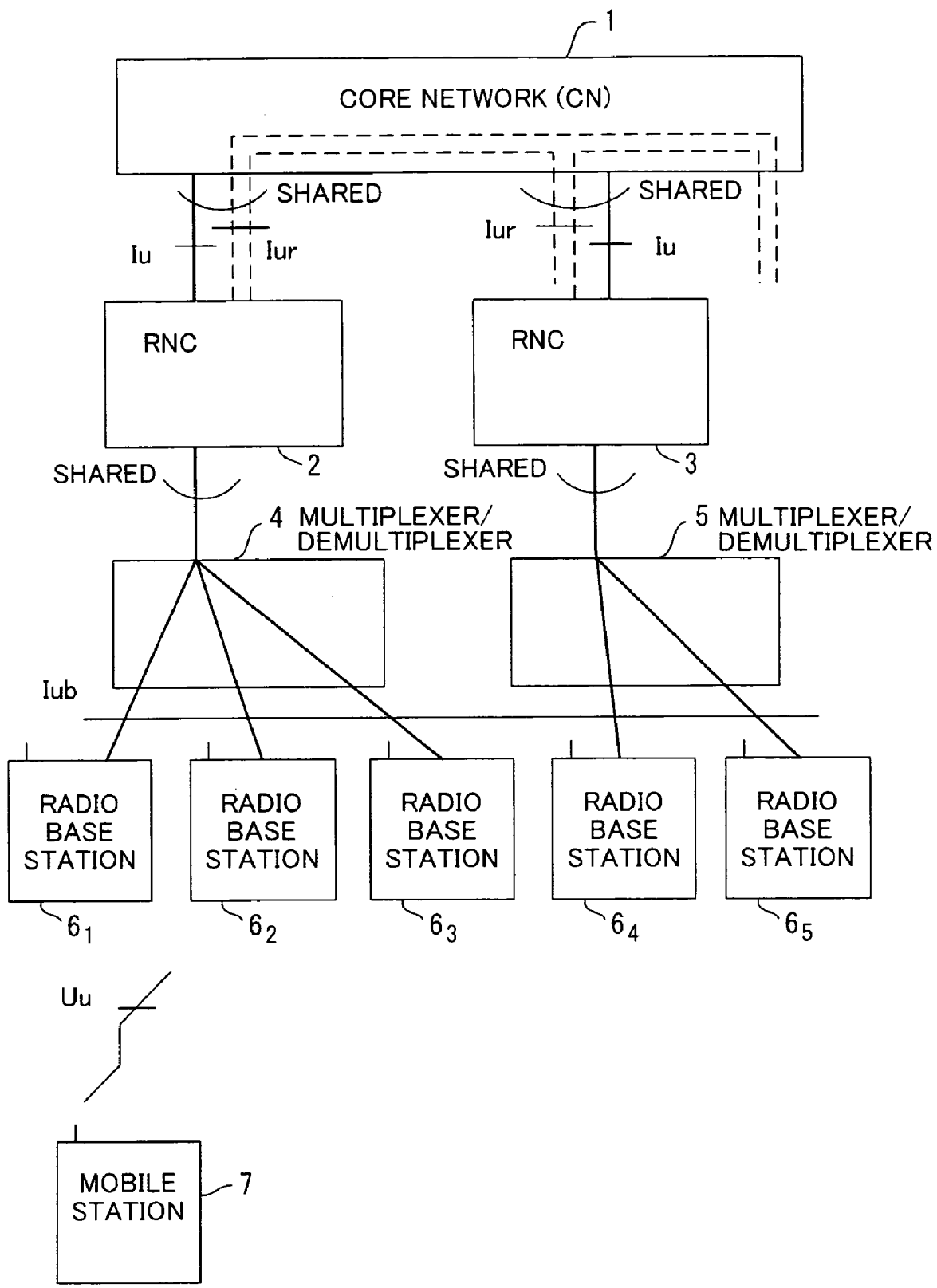
FIG. 15 is a block diagram depicting the W-CDMA (UMTS) mobile communication system.
Figure 16:
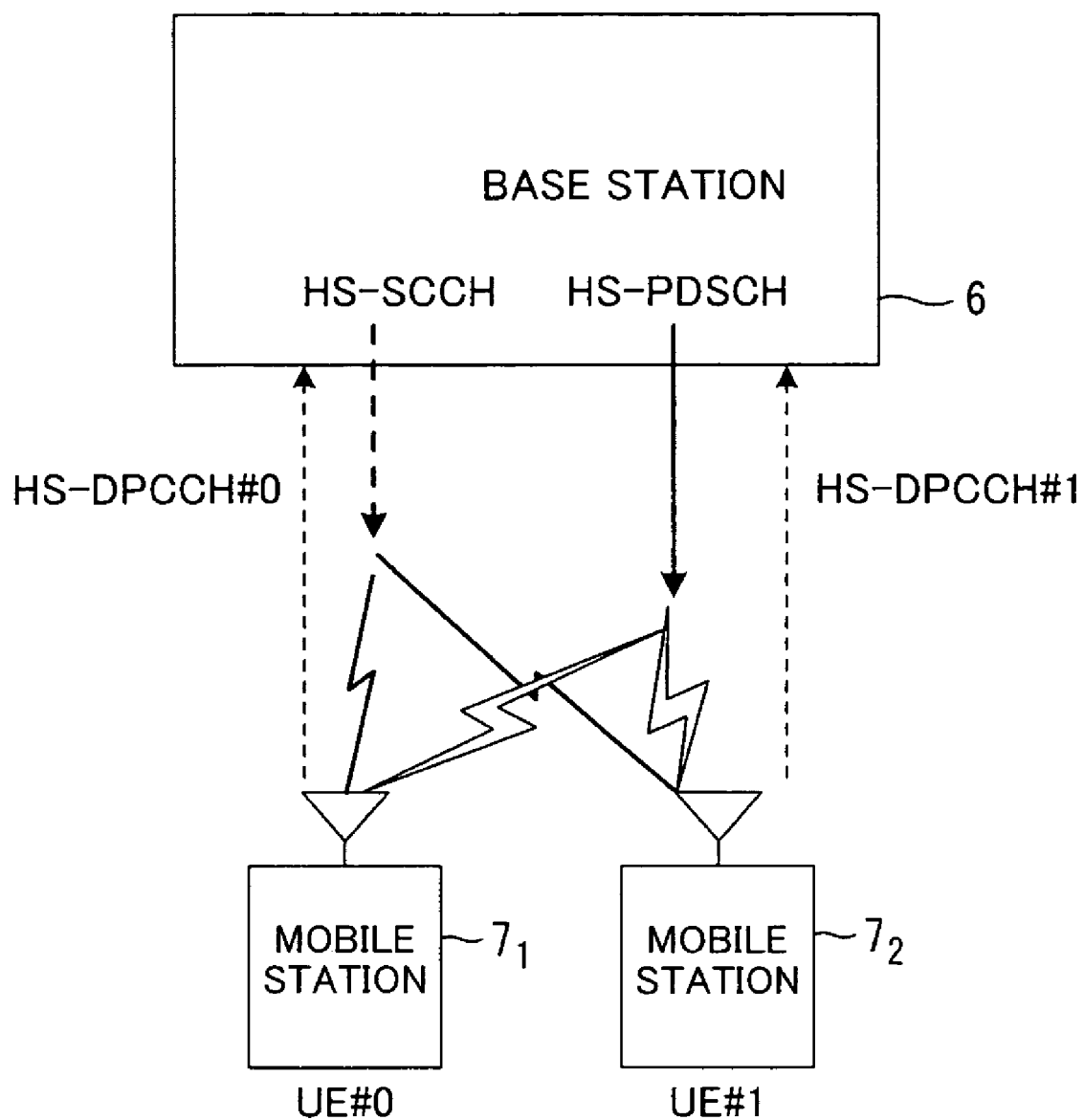
FIG. 16 is a diagram depicting a main radio channel used for HSDPA.
Figure 17:
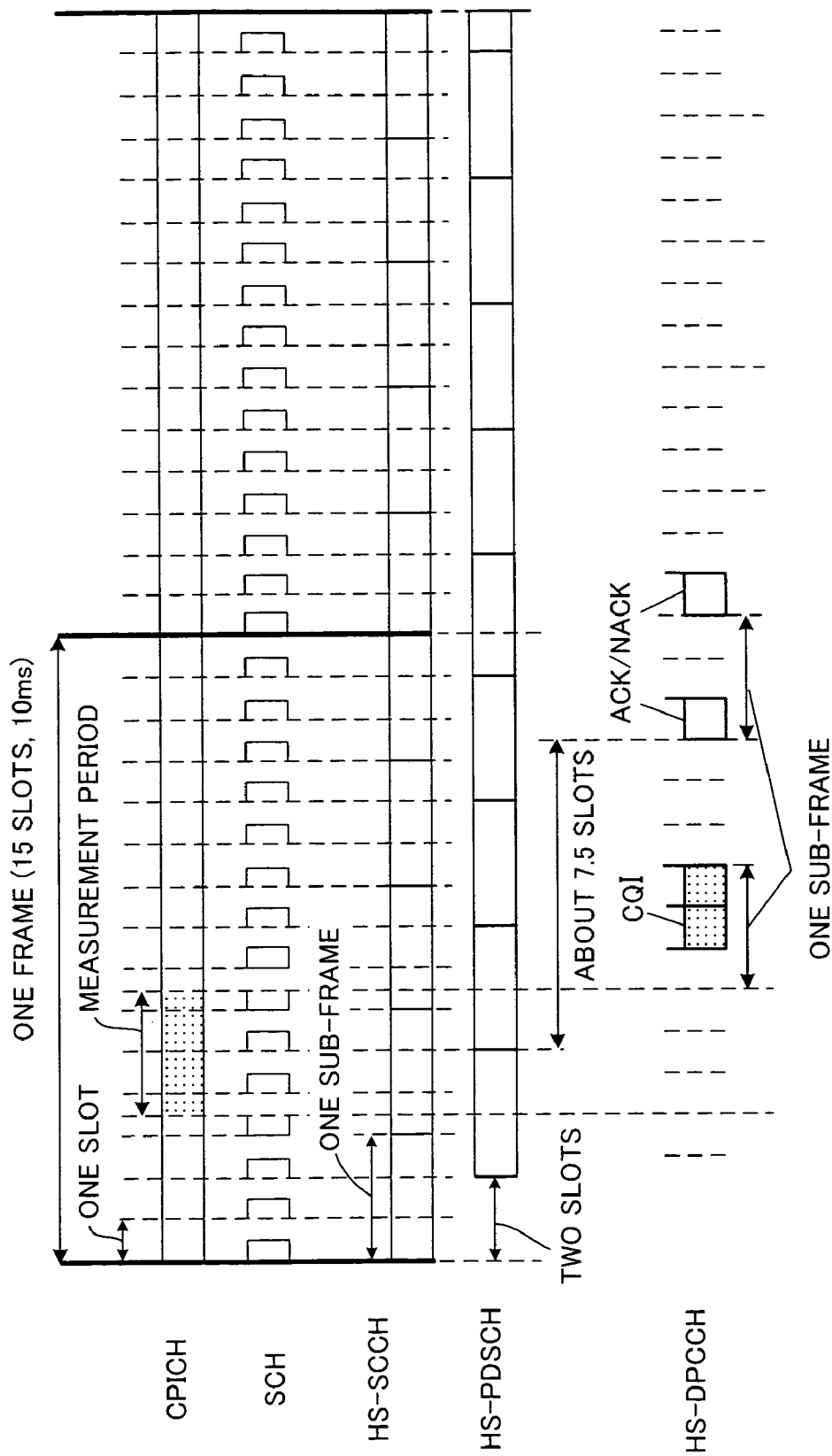
FIG. 17 is a diagram depicting the timing of the channel in the HSDPA system.

The first to third embodiments can be configured such that SIR is determined under the same SIR measurement conditions, and a CQI value, corresponding to the maximum SIR among the determined SIRs, is determined and reported to the base station. In other words, as FIG. 14 shows, SIR1 and SIR2, which are output from the de-spreading/quality measurement units $10_1$ and $10_2$ of the serving cell and the non-serving cell, are input to the CQI conversion unit 42. The CQI conversion unit 42 determines the CQI according to the maximum SIR and reports it to the base station.

According to this variant form, a CQI value after handover is reported to the base station quicker and the transmission rate can be controlled according to this CQI.

In the above description, the case when the present invention is applied to an HSDPA system was described, but the present invention can be applied to other similar communication systems. The present invention was described for the case when the communication environment between the base station and the mobile station is measured using SIR, but the present invention is not limited to using an SIR.

As many apparently widely different embodiments of the present invention can be made without departing from the spirit and scope thereof, it is to be understood that the invention is not limited to the specific embodiments thereof except as defined by the appended Claims.

What is claimed is:

1. A communication environment measurement method in a mobile station included in a communication system which respectively transmits pilot signals from a plurality of base stations to a mobile station and controls a hard handover by switching a channel for data transmission to said mobile station based on the communication environment between each base station and the mobile station, including steps of:

measuring the communication environment between a source base station of said channel and said mobile station, and the communication environment between another base station and said mobile station for said handover control, and compensating relative deterioration of the measurement result of the communication environment on the source base station of said channel in comparison with the measurement result of the communication environment on said other base station, the relative deterioration being caused by the transmission of said channel, wherein said step of compensating includes:

measuring total receive power of the signals received from the source base station of said channel;

measuring power of the signal of said channel received from the source base station of said channel;

measuring signal power of the pilot signal received from the source base station of said channel;

correcting the total receive power by subtracting the power of the signal via said channel from said total receive power;

calculating total noise power based on the total receive power after said correction, and measuring the communication environment between the source base station of said channel and said mobile station using said pilot power and said total noise power.

2. The communication environment measurement method according to claim 1, said step of calculating the total noise power includes:

storing ratio of the total receive power and internal noise power generated inside a mobile station in association with a value of each total receive power in the form of a table in advance;

calculating the internal noise power according to the total receive power after said correction using said association table, and calculating said total noise power by adding said internal noise power to external noise power.

3. A communication environment measurement method in a mobile station included in a communication system which respectively transmits pilot signals from a plurality of base stations to a mobile station and controls a hard handover by switching a channel for data transmission to said mobile station based on the communication environment between each base station and the mobile station, including steps of:

measuring the communication environment between a source base station of said channel and said mobile station, and the communication environment between another base station and said mobile station for said handover control, and compensating relative deterioration of the measurement result of the communication environment on the source base station of said channel in comparison with the measurement result of the communication environment on said other base station, the relative deterioration being caused by the transmission of said channel, wherein said step of compensating includes:

measuring total receive power of the signals received from said other base station;

measuring signal power of the pilot signal received from said other base station;

estimating signal power in a case where a signal is received from said other base station via said channel;

correcting the total receive power by adding said estimated signal power to the total receive power of the signals received from said other base station;

calculating total noise power based on the total receive power after said correction; and measuring the communication environment between said other base station and said mobile station using the signal power of the pilot signal received from said other base station and said total noise power.

4. The communication environment measurement method according to claim 3, wherein said step of estimating includes;

measuring the power of the pilot signal received from said source base station;

measuring the power of the signals of said channel received from said source base station; and computing ratio of the power of the pilot signal received from said source base station and the signal power of the signal received via said channel from the source base station; and estimating said power of the signal received via said channel from said other base station using the power of said pilot signal received from said other base station and said ratio.

5. The communication environment measurement method according to claim 3, wherein said step of calculating the total noise power includes:

storing ratio of the total receive power and internal noise power generated inside a mobile station in association with a value of each total receive power in the form of a table in advance;

calculating the internal noise power according to the total receive power after said correction using said association table, and calculating said total noise power by adding said internal noise power to external noise power.

6. A mobile station included in a communication system which respectively transmits the pilot signals from a plurality of base stations to a mobile station and controls a hard handover by switching a channel for data transmission to said mobile station based on the communication environment between each base station and the mobile station, comprising:

a measuring unit for measuring communication environment between a source base station of said channel and said mobile station and the communication environment between another base station and said mobile station for said handover control, and a compensation unit for compensating relative deterioration of the measurement result of the communication environment on the source base station of said channel in comparison with the measurement result of the communication environment on said other base station, the relative deterioration being caused by the transmission of said channel, wherein said compensation unit comprises:

a total receive power measurement unit for measuring total receive power of the signals received from the source base station of said channel;

a signal power measurement unit for measuring power of the signal of said channel received from the source base station of said channel;

a pilot signal power measurement unit for measuring signal power of the pilot signal received from the source base station of said channel; and a communication environment measurement unit for correcting the total receive power by subtracting the power of the signal via said channel from said total receive power, calculating total noise power based on the total receive power after said correction, and measuring the communication environment between the source base station of said channel and said mobile station using said pilot signal power and said total noise power.

7. The mobile station according to claim 6, further comprising a storage unit for storing ratio of the total receive power and internal noise power generated inside a mobile station in association with a value of each total receive power in the form of a table in advance, wherein said communication environment measurement unit calculates the internal noise power according to the total receive power after said correction using said association table, and calculates said total noise power by adding said internal noise power to external noise power.

8. The mobile station according to claim 6, further comprising a communication environment measurement unit for measuring the communication environment between said other base station and said mobile station using a pilot signal received from said other base station.

9. The mobile station according to claim 6, including:

means for determining maximum SIR, which is a ratio of the pilot signal power and the noise signal power, out of the SIRs of a plurality of base stations measured when the communication environment between said base station and the mobile station was measured as SIR, and feeding back the communication environment instruction value corresponding to said maximum SIR to said source base station.

10. A mobile station included in a communication system which respectively transmits the pilot signals from a plurality of base stations to a mobile station and controls a hard handover by switching a channel for data transmission to said mobile station based on the communication environment between each base station and the mobile station, comprising:

a measuring unit for measuring communication environment between a source base station of said channel and said mobile station and the communication environment between another base station and said mobile station for said handover control, and a compensation unit for compensating relative deterioration of the measurement result of the communication environment on the source base station of said channel in comparison with the measurement result of the communication environment on said other base station, the relative deterioration being caused by the transmission of said channel, wherein said compensation unit includes:

a total receive power measurement unit for measuring total receive power of the signals received from said other base station;

a pilot signal power measurement unit for measuring signal power of the pilot signal received from said other base station;

and a communication environment measurement unit for estimating signal power in a case where a signal is received from said other base station via said channel, correcting the total receive power by adding said estimated signal power to the total receive power of the signals received from said other base station, calculating total noise power based on the total receive power after said correction, and measuring the communication environment between said other station and said mobile station using the signal power of the pilot signal received from said other base station and said total noise power.

11. The mobile station according to claim 10, wherein said communication environment measurement unit comprises:

a pilot signal power measurement unit for measuring the power of the pilot signal received from said source base station;

a signal power measurement unit for measuring the power of the signals of said channel received from said source base station; and an estimation unit for computing ratio of the power of the pilot signal received from said source base station and the signal power of the signal received via said channel from the source base station, and estimating said power of the signal received via said channel from said other base station using the power of said pilot signal received from said other base station and said ratio.

12. The mobile station according to claim 10, wherein said communication environment measurement unit includes:

a storage unit for storing ratio of the total receive power and internal noise power generated inside a mobile station in association with a value of each total receive power in the form of a table in advance; and a noise power correction unit for calculating the internal noise power according to the total receive power after said correction using said association table, and correcting said total noise power by adding said internal noise power to external noise power.

13. A mobile station included in a communication system which respectively transmits the pilot signals from a plurality of base stations to a mobile station and controls a hard handover by switching a channel for data transmission to said mobile station based on the communication environment between each base station and the mobile station, comprising:

a judgment unit for judging the timing when data is not communicated via said channel referring to the control channel to be transmitted from the source base station of said channel;

a communication environment measurement unit for measuring the communication environment between the source base station of said channel and said mobile station based on the pilot signal received from the source base station of said channel at said timing, a communication environment measurement unit for measuring the communication environment between said other base station and the mobile station based on a pilot signal received from said other base station which is not in-communication; and a communication environment reporting unit for reporting said measured communication environments to the source base station.

14. A communication environment measurement method in a mobile station included in a communication system which respectively transmits pilot signals from a plurality of base stations to a mobile station and controls a hard handover by switching a channel for data transmission to said mobile station based on the communication environment between each base station and the mobile station, including steps of:

measuring the communication environment between a source base station of said channel and said mobile station, and the communication environment between another base station and said mobile station for said handover control;

compensating relative deterioration of the measurement result of the communication environment on the source base station of said channel in comparison with the measurement result of the communication environment on said other base station, the relative deterioration being caused by the transmission of said channel; and adjusting compensating quantity at the timing of compensating based upon the measurement result of reception quality of said channel sent from the source base station.

15. A mobile station included in a communication system which respectively transmits the pilot signals from a plurality of base stations to a mobile station and controls a hard handover by switching a channel for data transmission to said mobile station based on the communication environment between each base station and the mobile station, comprising:

a measuring unit for measuring communication environment between a source base station of said channel and said mobile station and the communication environment between another base station and said mobile station for said handover control;

a compensation unit for compensating relative deterioration of the measurement result of the communication environment on the source base station of said channel in comparison with the measurement result of the communication environment on said other base station, the relative deterioration being caused by the transmission of said channel; and an adjustment unit for adjusting compensating quantity at the timing of compensating based upon the measurement result of reception quality of said channel sent from the source base station.

16. The mobile station according to claim 15, wherein the compensation unit executes compensation by upward-correcting said measurement result of the communication environment on the source base station of said channel or downward-correcting said measurement result of the communication environment on said other base station.

* * * * *